(12) United States Patent
Piggott et al.

(10) Patent No.: US 12,730,200 B2
(45) Date of Patent: Sep. 8, 2026

(54) LIDAR SYSTEMS WITH PLANAR MULTI-PIXEL SENSING ARRAYS

(71) Applicant: Waymo LLC, Mountain View, CA (US)

(72) Inventors: Alexander Yukio Piggott, Mountain View, CA (US); Jason Watson, San Jose, CA (US); Lin Liu, Santa Clara, CA (US); Blaise Laurent Patrick Gassend, East Palo Alto, CA (US); Ralph Hamilton Shepard, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 979 days.

(21) Appl. No.: 17/947,988

(22) Filed: Sep. 19, 2022

(65) Prior Publication Data

US 2024/0094360 A1 Mar. 21, 2024

(51) Int. Cl.
*G01S 7/4914* (2020.01)
*G01S 7/481* (2006.01)
(Continued)

(52) U.S. Cl.
CPC .......... *G01S 7/4914* (2013.01); *G01S 7/4817* (2013.01); *G01S 7/4911* (2013.01); *G01S 7/4917* (2013.01); *G01S 7/499* (2013.01); *G01S 17/58* (2013.01)

(58) Field of Classification Search
CPC .... G01S 7/4914; G01S 7/4817; G01S 7/4911; G01S 7/4917; G01S 7/499; G01S 17/58; G01S 7/4814; G01S 7/4816; G01S 17/42; G01S 13/862; G01S 13/865; G01S 13/867; G01S 17/86; G01S 17/931; G01S 17/34; G01S 17/933
(Continued)

(56) References Cited

U.S. PATENT DOCUMENTS

| | | | |
|---|---|---|---|
| 8,112,223 | B2 | 2/2012 | Jordan et al. |
| 9,513,497 | B2 | 12/2016 | Guzzon et al. |

(Continued)

OTHER PUBLICATIONS

Aalto et al., "Open-Access 3-μm SOI Waveguide Platform for Dense Photonic Integrated Circuits", in IEEE Journal of Selected Topics in Quantum Electronics, vol. 25, No. 5, pp. 1-9 (2019).

(Continued)

*Primary Examiner* — Isam A Alsomiri
(74) *Attorney, Agent, or Firm* — Christensen O'Connor Johnson Kindness PLLC

(57) ABSTRACT

The subject matter of this specification can be implemented in, among other things, systems and methods of optical sensing for pixel multiplexing and polarized beam steering. Described, among other things, is a system that includes a light source configured to generate a light and one or more optical devices, integrated on a photonic integrated circuit, configured to impart modulation to the generated light and deliver the modulated light to an interface coupling device. The interface coupling device can include a plurality of interface couplers (ICs), each IC configured to scatter the modulated light in a direction that makes at least 5 degrees with an optical axis of lens configured to transmit the light scattered by each IC along a respective direction of a plurality of directions.

20 Claims, 11 Drawing Sheets

(51) Int. Cl.

| | |
|---|---|
| ***G01S 7/4911*** | (2020.01) |
| ***G01S 7/4912*** | (2020.01) |
| ***G01S 7/499*** | (2006.01) |
| ***G01S 17/58*** | (2006.01) |

(58) Field of Classification Search

USPC .......................................................... 356/4.01

See application file for complete search history.

(56) References Cited

U.S. PATENT DOCUMENTS

| | | | | |
|---|---|---|---|---|
| 9,851,470 | B2 | 12/2017 | Henderson | |
| 10,436,906 | B2 | 10/2019 | Droz | |
| 10,686,523 | B1 | 6/2020 | Gleason et al. | |
| 11,112,503 | B2 * | 9/2021 | Fried | G01S 17/42 |
| 12,061,249 | B1 | 8/2024 | Loui et al. | |
| 2002/0159128 | A1 | 10/2002 | Green | |
| 2010/0001744 | A1 | 1/2010 | Hirayama et al. | |
| 2014/0254972 | A1 | 9/2014 | Fujino et al. | |
| 2018/0128974 | A1 | 5/2018 | Iida et al. | |
| 2018/0372951 | A1 | 12/2018 | Hashiya et al. | |
| 2019/0391243 | A1 | 12/2019 | Nicolaescu | |
| 2020/0249351 | A1 | 8/2020 | Chen et al. | |
| 2020/0256958 | A1 | 8/2020 | Piggott | |
| 2020/0284883 | A1 * | 9/2020 | Ferreira | G01S 7/4815 |
| 2021/0382142 | A1 | 12/2021 | Rogers et al. | |
| 2021/0405290 | A1 | 12/2021 | Hayenga et al. | |
| 2023/0027271 | A1 | 1/2023 | Jin et al. | |
| 2025/0013081 | A1 | 1/2025 | Menard et al. | |

OTHER PUBLICATIONS

Chung et al., "Low-power thermo-optic silicon modulator for large-scale photonic integrated systems", Opt. Express 27, 13430-13459 (2019).

Cook, et al., "Polysilicon Grating Switches for LiDAR", Journal of Microelectromechanical Systems, vol. 29, No. 5, pp. 1008-1013 (2020).

Dickson et al., "Holographic polarization-separation elements", Appl. Opt. 33, 5378-5385 (1994).

Gajda et al., "Design rules for p-i-n diode carriers sweeping in nano-rib waveguides on SOI", Opt. Express 19, 9915-9922 (2011).

Inoue et al., "Demonstration of a new optical scanner using silicon photonics integrated circuit", Opt. Express 27, 2499-2508 (2019).

Lalanne et al., "A transmission polarizing beam splitter grating", Journal of Optics A: Pure and Applied Optics, vol. 1, No. 2 (1999).

Lee et al., "Silicon Photonic Switch Fabrics: Technology and Architecture", Journal of Lightwave Technology, vol. 37, No. 1, pp. 6-20 (2019).

Li et al., "Lens-based integrated 2D beam-steering device with defocusing approach and broadband pulse operation for Lidar application", Opt. Express 27, 32970-32983 (2019).

Marchetti, et al., "Coupling strategies for silicon photonics integrated chips [Invited]", Photon. Res. 7, 201-239 (2019).

Masood et al., "Comparison of heater architectures for thermal control of silicon photonic circuits", 10th International Conference on Group IV Photonics, (2013).

Michaels A., EMOpt (2020), https://emopt.readthedocs.io/en/latest/tutorial_2D_grating_coupler.html.

Mu et al., "Edge Couplers in Silicon Photonic Integrated Circuits: A Review", Applied Sciences, 2020, vol. 10, 29 pages.

Oh et al., "Achromatic diffraction from polarization gratings with high efficiency", Opt. Lett. 33, 2287-2289 (2008).

Piggott, A., "Understanding the physics of coherent LiDAR", arXiv:2011.05313 (2020).

Rogers et al., "A universal 3D imaging sensor on a silicon photonics platform", Nature 590, 256-261 (2021).

Rong et al., "An all-silicon Raman laser", Nature 433, 292-294 (2005).

Tu et al., "State of the Art and Perspectives on Silicon Photonic Switches", Micromachines 2019, 10, 51.

Turner-Foster et al., "Ultrashort free-carrier lifetime in low-loss silicon nanowaveguides", Opt. Express 18, 3582-3591 (2010).

Aeye iDAR "iDAR is Smarther than LiDAR", aeye.ai/idar/, retrieved Oct. 20, 2020, 11 pages.

Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.

GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.

Lekavich, J., "Basics of Acousto-Optic Devices", Lasers & Applications Apr. 1986, pp. 59-64.

Zhu H., et al., "On-Chip Optical Power Monitor Using Periodically Interleaved P-N Junctions Integrated on a Silicon Waveguide," IEEE Journal of Selected Topics in Quantum Electronics, Jul./Aug. 2014, vol. 20(4), 8 Pages.

* cited by examiner 305
312
306
310
302
308

FIG. 3B

300
Input Light 304
Lens 306
302

FIG. 3A 315
302
Lens 306

320
Lens 306
302

610

LIDAR SYSTEMS WITH PLANAR MULTI-PIXEL SENSING ARRAYS

TECHNICAL FIELD

The instant specification generally relates to range and velocity sensing in applications that involve determining locations and velocities of moving objects using optical signals reflected from the objects. More specifically, the instant specification relates to systems and techniques that enable efficient multiplexing of sensing signals.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (or towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (radio, optical, infrared) sensors and charting a driving path through the environment based on the sensed data. Additionally, the driving path can be determined based on Global Navigation Satellite System (GNSS) data and road map data. While the GNSS and the road map data can provide information about static aspects of the environment (such as buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIGS. 3A-3D illustrate example architecture and operations of an interface coupling device that uses positioning of multiple interface couplers around a curve in the plane of a PIC for efficient pixel multiplexing in an optical sensing system, in accordance with some implementations of the present disclosure.

SUMMARY

Figure 1:
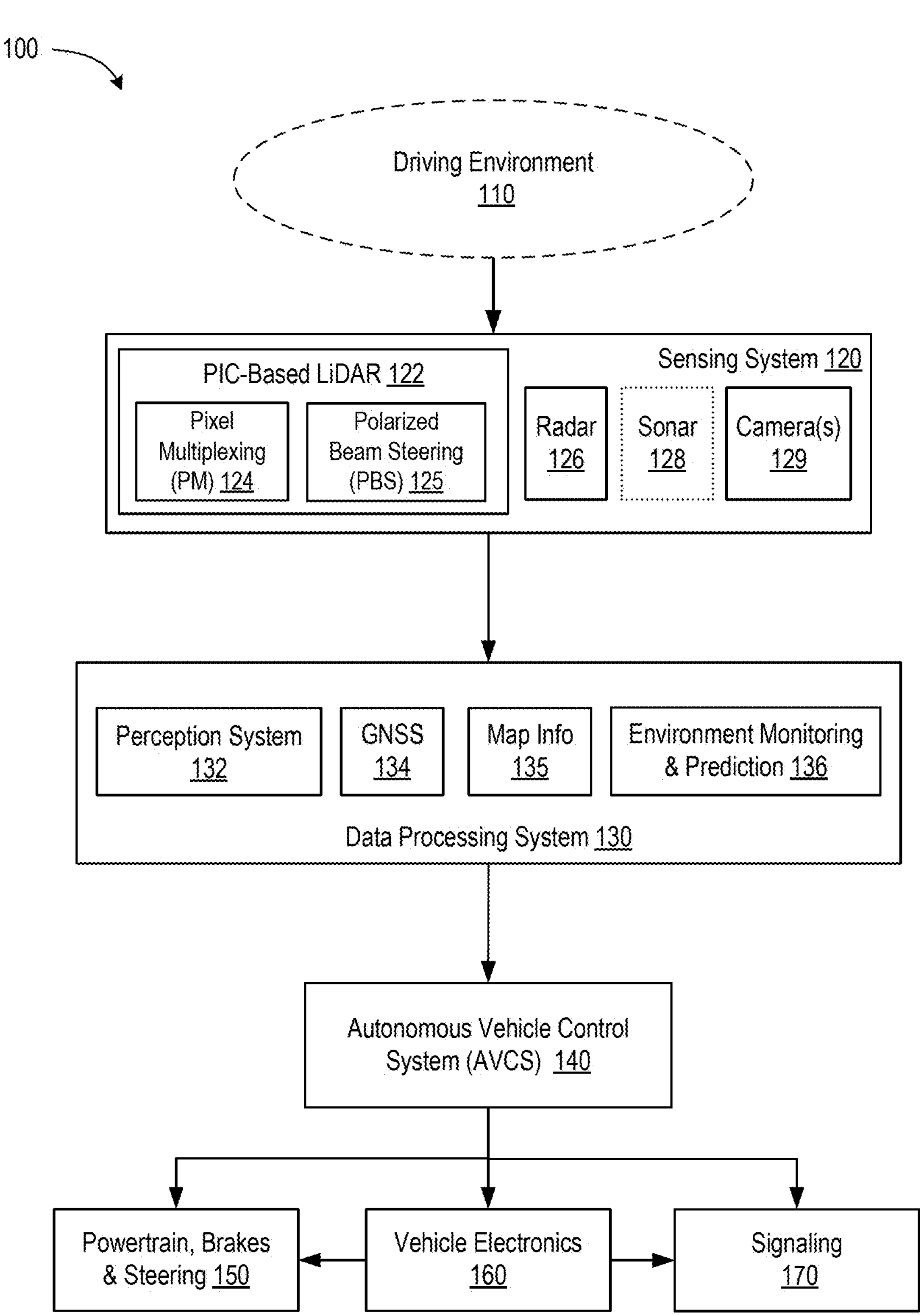
FIG. 1 is a diagram illustrating components of an example autonomous vehicle (AV) that deploys a lidar device capable of efficient pixel multiplexing and polarized beam steering, in accordance with some implementations of the present disclosure.

In one implementation, disclosed is an optical system that includes a light source configured to generate a light, and one or more optical devices, integrated in a photonic integrated circuit (PIC), configured to impart modulation to the generated light, and deliver the modulated light to an interface coupling device. The interface coupling device includes a plurality of interface couplers (ICs) integrated on the PIC, wherein each IC is configured to scatter the modulated light in a direction that makes an angle of at least 5 degrees with an optical axis of a first lens configured to transmit the light scattered by each IC along a respective direction of a plurality of directions.

In another implementation, disclosed is an optical system that includes a light source configured to generate a light and one or more optical devices, integrated in a photonic integrated circuit (PIC), configured to impart modulation to the generated light, and deliver the modulated light to an interface coupling device. The interface coupling device includes a first interface coupler (IC), integrated in the PLC, configured to produce, from the modulated light, a transmitted (TX) light, wherein the TX light has a first polarization. The interface coupling device further includes a second IC, integrated in the PIC, configured to receive a received (RX) light generated upon interaction of the TX light with an object, wherein the RX light has a second polarization. The interface coupling device further includes one or more polarization-sensitive diffraction optical elements (DOEs) configured to change direction of at least one of the TX light or the RX light.

In another implementation, disclosed is a method that includes generating a light using a light source, and imparting modulation to the generated light. The method further includes delivering the modulated light to an interface coupling device comprising a plurality of interface couplers (ICs) integrated on a photonic integrated circuit (PIC). The method further includes scattering the modulated light, using the plurality of ICs, wherein each IC is configured to scatter the modulated light in a direction that makes an angle of at least 5 degrees with an optical axis of a first lens. The method further includes transmitting through the first lens the light scattered by each IC along a respective direction of a plurality of directions.

DETAILED DESCRIPTION

An autonomous vehicle (AV) or a driver-operated vehicle that uses various driver-assistance technologies can employ light detection and ranging (lidar) systems to detect distances to various objects in the environment and, sometimes, the velocities of such objects. A lidar emits one or more laser signals (pulses) that travel to an object and then detects incoming signals reflected from the object. By determining a time delay between the signal emission and the arrival of the reflected waves, a time-of-flight (ToF) lidar can determine the distance to the object. A typical lidar emits signals in multiple directions to obtain a wide view of the driving environment of the AV. The outside environment can be any environment including any urban environment (e.g., street, and a sidewalk), rural environment, highway environment, indoor environment (e.g., the environment of an industrial plant, a shipping warehouse, and a hazardous area of a building), marine environment, and so on. The outside environment can include multiple stationary objects (e.g., roadways, buildings, bridges, road signs, shoreline, rocks, and trees), multiple movable objects (e.g., vehicles, bicyclists, pedestrians, animals, ships, and boats), and/or any other objects located outside the AV. For example, a lidar device can cover (e.g., scan) an entire 360-degree view by collecting a series of consecutive frames identified with timestamps. As a result, each sector in space is sensed in time increments that are determined by the angular velocity of the lidar's scanning speed. Sometimes, an entire 360-degree view of the outside environment can be obtained over a scan of the lidar. Alternatively, any smaller sector, e.g., a 1-degree sector, a 5-degree sector, a 10-degree sector, or any other sector can be scanned, as desired.

ToF lidars can also be used to determine velocities of objects in the outside environment, e.g., by detecting two (or more) locations $r(t_1)$, $r(t_2)$ of some reference point of an object (e.g., the front end of a vehicle) and inferring the velocity as the ratio, $v=[r(t_2)-r(t_1)]/[t_2-t_1]$. By design, the measured velocity v is not the instantaneous velocity of the object but rather the velocity averaged over the time interval $t_z-t_1$, as the ToF technology does not allow to ascertain whether the object maintained the same velocity v during this time or experienced an acceleration or deceleration (with detection of acceleration/deceleration requiring additional locations $r(t_3)$, $r(t_4)$ . . . of the object).

Coherent or Doppler lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the outside environment. A signal emitted by a coherent lidar can be modulated (in frequency and/or phase) with a radio frequency (RF) signal prior to being transmitted to a target. A local oscillator (LO) copy of the transmitted signal can be maintained on the lidar and mixed with a signal reflected from the target; a beating pattern between the two signals can be extracted and Fourier-analyzed to determine the Doppler frequency shift of $f_D$ and signal travel time r to and from the target. The (radial) velocity V of the target relative to the lidar and the distance L to the target can then be determined as $$V = \frac{cf_D}{2f}, \quad L = \frac{c\tau}{2}.$$

where c is the speed of light and f is the optical frequency of the transmitted signal. More specifically, coherent lidars can determine the velocity of the target and the distance to the target by correlating phase information $\phi_R(t)$ of the reflected signal with phase modulation $\phi_{LO}(t-\tau)$ of the time-delayed local oscillator (LO) copy of the transmitted signal. The correlations can be analyzed in the Fourier domain with a peak of the correlation function identifying the time of flight $\tau$.

A photonic integrated circuit (PIC) is an increasingly popular platform for implementing lidar sensing systems. PICs can combine numerous optical elements and components on a single substrate (chip), including but not limited to waveguides, beam splitters, optical (e.g., directional) couplers, light switches, phase shifters, optical amplifiers, diffraction gratings, photodiodes, and various other optical elements. For example, a PIC-based lidar system can include a semiconductor laser to produce light, electro-optic modulators to impart modulation to the light, optical interface couplers (e.g., diffraction gratings) to output (transmit) the light towards a target object and detect light reflected from the target object, photodetectors to probe frequency and modulation of the reflected light, and so on. Being implemented on a chip, elements of a PIC process the light while the light propagates substantially within the plane of the PIC, e.g., defined by the substrate and various semiconducting, insulating, and conducting layers deposited thereon. The light confined to the PIC has to be coupled to the modes of the free space that carry the light energy to the target object. This function can be performed by various edge couplers (e.g., tapered waveguides) positioned along an edge of the PIC. Such couplers can efficiently transmit light to the outer space (and, conversely, collect reflected light from the outer space), but are naturally limited to a one-dimensional (linear) array of transmitters. In lidar applications, however, it is beneficial to maximize the number of couplers probing different directions of space (sensing "pixels") simultaneously, for increased resolution and speed of sensing. It is, therefore, advantageous to arrange couplers in a two-dimensional array (matrix), each coupler sending transmitted beams along a different direction. More specifically, the matrix of couplers can be arranged within the plane of the PIC with the couplers radiating light along the direction perpendicular to the plane of the PIC (the normal direction).

The couplers, e.g., diffraction grating-based couplers, however, have a sub-optimal radiance in the direction perpendicular to the direction of beam propagation in the waveguide. This is predicated on the fact that the conditions for constructive interference along the normal direction also cause a constructive interference along the direction of retro-reflection within the PIC, which significantly diminishes the power of the radiated light. Configuring the planar couplers to radiate away from the normal direction (e.g., 20 degrees away from the normal) reduces backscattering but poses other challenges. In particular, the light radiated by the couplers is usually processed (e.g., collimated) by an objective lens whose focal plane coincides with the plane of the couplers. Configuring the couplers to radiate the light away from the normal direction means that only some of the couplers can be within the focal plane of the objective lens (if the direction of radiation is parallel to the optical axis of the lens). On the other hand, if all couplers are placed within the focal plane of the lens, the direction of radiation is not parallel to the optical axis of the objective lens. Both such arrangements are sub-optimal and suffer from defocus, non-uniformity, increased aberration, etc. As a result, the resolution of the lidar multi-pixel sensing is diminished.

Aspects and implementations of the present disclosure enable methods and systems where each coupler is located at a focus of the objective lens while at the same time radiating at an oblique direction tilted away from the normal direction of the PIC, so that the retro-reflection is limited. In some implementations, multiple couplers are located around a ring (or multiple concentric rings) with the center(s) located on the optical axis of the objective lens. Consequently, all couplers can be positioned within the focal plane of the objective lens with all couplers of a given ring configured to radiate at the same tilt angle to the normal direction of the PIC, which can also be the direction of the optical axis of the objective lens. In some implementations, an array of couplers can radiate along substantially the same direction and one or more additional optical elements can be used to redirect, towards the objective lens, the light emitted by the couplers. For example, a single field lens can be used to direct the light toward the objective lens. In some implementations, a separate microlens, a microprism, a diffraction optical element can be positioned near each coupler to redirect the light emitted by the respective coupler. In some implementations, each coupler can be used in a monostatic configuration where each coupler is simultaneously used as a transmitting optical antenna and as a receiving optical antenna (the optical transceiver). This has the advantage of forcing the transmitted beam and the reflected beam to follow the same optical path, which is conductive for accurate lidar sensing. In some implementations, a coupler used as the receiving antenna can be different from the coupler used as the transmitting antenna so that the transmitted light and the reflected light follow separate optical paths for a small portion of the paths. The beams are collapsed into a single optical path outside this small portion. This can be accomplished, in one example, using polarization-sensitive diffractive optical elements (DOEs). More specifically, the transmitting coupler can be configured to emit light with a first polarization and the receiving coupler can be configured to receive light of a second polarization. For example, a polarization-sensitive DOE can be used to cause the transmitted light and the reflected light to follow the same optical path on one side of the DOE but have different (split) optical paths, leading to the two couplers, on the other side of the DOE. Numerous other arrangements and implementations are disclosed herein. Additionally, each TX-RX pair of couplers can be an element of a one-dimensional or two-dimensional array of pixels that is placed within the focal plane of the objective lens and whose emission is redirected using one of the techniques referenced above.

The advantages of the disclosed implementations include, but are not limited to, the lidar sensing systems supporting a large number of PIC-based sensing pixels capable of probing multiple directions simultaneously or via time multiplexing. Each of the multiple pixels can provide high-quality sensing data associated with a particular direction of space. Such PIC-based lidar multiplexing reduces costs of the sensing systems while also increasing efficiency and accuracy of speed and velocity detections. This, in turn, improves safety of lidar-based applications, such as autonomous vehicle driving missions, FIG. 1 is a diagram illustrating components of an example autonomous vehicle (AV) 100 that deploys a lidar device capable of efficient pixel multiplexing and polarized beam steering, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, and sidewalk delivery robotic vehicles) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 110 can be or include any portion of the outside environment containing objects that can determine or affect how driving of the AV occurs. More specifically, a driving environment 110 can include any objects (moving or stationary) located outside the AV, such as roadways, buildings, trees, bushes, sidewalks, bridges, mountains, other vehicles, pedestrians, bicyclists, and so on. The driving environment 110 can be urban, suburban, rural, and so on. In some implementations, the driving environment 110 can be an off-road environment (e.g. farming or agricultural land). In some implementations, the driving environment can be inside a structure, such as the environment of an industrial plant, a shipping warehouse, a hazardous area of a building, and so on. In some implementations, the driving environment 110 can consist mostly of objects moving parallel to a surface (e.g., parallel to the surface of Earth). In other implementations, the driving environment can include objects that are capable of moving partially or fully perpendicular to the surface (e.g., balloons, and leaves falling). The term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. Radar unit 126 may deploy a sensing technology that is similar to the lidar technology but uses a radio wave spectrum of the electromagnetic waves. For example, radar unit 126 may use 10-100 GHz carrier radio frequencies. Radar unit 126 may be a pulsed ToF radar, which detects a distance to the objects from the time of signal propagation, or a continuously-operated coherent radar, which detects both the distance to the objects as well as the velocities of the objects, by determining a phase difference between transmitted and reflected radio signals. Compared with lidars, radar sensing units have lower spatial resolution (by virtue of a much longer wavelength), but lack expensive optical elements, are easier to maintain, have a longer working range, and are less sensitive to adverse weather conditions. An AV may often be outfitted with multiple radar transmitters and receivers as part of the radar unit 126. The radar unit 126 can be configured to sense both the spatial locations of the objects (including their spatial dimensions) and their velocities (e.g., using the radar Doppler shift technology). The sensing system 120 can include a lidar sensor 122 (e.g., a lidar rangefinder), which can be a laser-based unit capable of determining distances to the objects in the driving environment 110 as well as, in some implementations, velocities of such objects. The lidar sensor 122 can utilize wavelengths of electromagnetic waves that are shorter than the wavelength of the radio waves and can thus provide a higher spatial resolution and sensitivity compared with the radar unit 126. The lidar sensor 122 can include a ToF lidar and/or a coherent lidar sensor, such as a frequency-modulated continuous-wave (FMCW) lidar sensor, phase-modulated lidar sensor, amplitude-modulated lidar sensor, and the like. Coherent lidar sensors can use optical heterodyne detection for velocity determination. In some implementations, the functionality of the ToF lidar sensor and coherent lidar sensor can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor units can be mounted on an AV, e.g., at different locations separated in space, to provide additional information about a transverse component of the velocity of the reflecting object.

Lidar sensor 122 can include one or more laser sources producing and emitting signals and one or more detectors of the signals reflected back from the objects. Lidar sensor 122 can include spectral filters to filter out spurious electromagnetic waves having wavelengths (frequencies) that are different from the wavelengths (frequencies) of the emitted signals. In some implementations, lidar sensor 122 can include directional filters (e.g., apertures, diffraction gratings, and so on) to filter out electromagnetic waves that can arrive at the detectors along directions different from the reflection directions for the emitted signals. Lidar sensor 122 can use various other optical components (lenses, mirrors, gratings, optical films, interferometers, spectrometers, local oscillators, and the like) to enhance sensing capabilities of the sensors.

In some implementations, lidar sensor 122 can include one or more 360-degree scanning units (which scan the outside environment in a horizontal direction, in one example). In some implementations, lidar sensor 122 can be capable of spatial scanning along both the horizontal and vertical directions. In some implementations, the field of view can be up to 90 degrees in the vertical direction (e.g., with at least a part of the region above the horizon scanned by the lidar signals or with at least part of the region below the horizon scanned by the lidar signals). In some implementations (e.g., in aeronautical environments), the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate, generally, at the near-infrared wavelength, but can include sensing technology that operate at other wavelengths as well.

In some implementations, lidar sensor 122 can be a PIC-based sensor and can include at least one of a pixel multiplexing (PM) 124 or polarized beam steering (PBS) 125 functionality. PM 124 can use PIC-based delivery of TX sensing beams to multiple optical interface couplers that output sensing beams along different directions in space. PM 124 simplifies PIC design and manufacturing while simultaneously reducing intensity of retro-reflections of TX beams by configuring interface couplers to output light away from the direction(s) where strong retro-reflections occur (e.g., away from the direction that is perpendicular to the plane of the PIC) and compensating for the tilt using various optical elements (e.g., lenses, gratings, and mirrors). As a result, the interface couplers can provide sensing pixel functionality that is uniform across multiple (or all) interface couplers. PBS 125 can be used to combine the benefits of the monostatic lidar systems (identical optical paths for transmitted and reflected beams) with advantages of the bistatic lidar systems (absence of retro-reflections) using polarization-sensitive optical elements. More specifically PBS 125 can use s-polarized (or p-polarized) light in the transmitted beam and select the opposite p-polarization (s-polarization) for the RX beam. Additionally, PBS 125 can use one or more polarization-sensitive diffractive optical elements to selectively direct the TX beam and the RX beam along the common optical path outside the lidar sensor 122 while steering the TX beam and the RX beam away from each other inside the lidar sensor 122. As a result, separate interface couplers can be used as the transmission optical antenna and the reception optical antenna, to reduce or eliminate retro-reflections.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. Some of the cameras 129 of the sensing system 120 can be high resolution cameras (HRCs) and some of the cameras 129 can be surround view cameras (SVCs). The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (Doppler data and/or ToF data) to determine distances to various objects in the driving environment 110 and velocities (radial and transverse) of such objects. In some implementations, the perception system 132 can also receive the radar sensing data, which may similarly include distances to various objects as well as velocities of those objects. Radar data can be complementary to lidar data, e.g., whereas lidar data may high-resolution data for low and mid-range distances (e.g., up to several hundred meters), radar data may include lower-resolution data collected from longer distances (e.g., up to several kilometers or more). In some implementations, perception system 132 can use the lidar data and/or radar data in combination with the data captured by the camera(s) 129. In one example, the camera(s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., lidar sensor 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which can include a GPS transceiver (not shown), configured to obtain information about the position of the AV relative to Earth and its surroundings. The GNSS (or other positioning) data processing module 134 can use the positioning data (e.g., GNSS, GPS, and IMU data) in conjunction with the sensing data to help accurately determine the location of the AV with respect to fixed objects of the driving environment 110 (e.g. roadways, lane boundaries, intersections, sidewalks, crosswalks, road signs, curbs, and surrounding buildings) whose locations can be provided by map information 135, in some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the moving objects. In some implementations, environment monitoring and prediction component 136 can keep track of the changing appearance of the driving environment due to motion of the AV relative to the environment. In some implementations, driving environment monitoring and prediction component 136 can make predictions about how various moving objects of the driving environment 110 will be positioned within a prediction time horizon. The predictions can be based on the current locations and velocities of the moving objects as well as on the tracked dynamics of the moving objects during a certain (e.g., predetermined) period of time. For example, based on stored data for object 1 indicating accelerated motion of object 1 during the previous 3-second period of time, environment monitoring and prediction component 136 can conclude that object 1 is resuming its motion from a stop sign or a red traffic light signal. Accordingly, environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 136 can conclude that object 2 is stopping at a stop sign or at a red traffic light signal. Accordingly, environment monitoring and prediction component 136 can predict where object 2 is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the GNSS data processing module 134, and environment monitoring and prediction component 136 can be used by an autonomous driving system, such as AV control system (AVCS) 140. The AVCS 140 can include one or more algorithms that control how AV 100 is to behave in various driving situations and driving environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size, shape, and trajectories of the obstacles (if obstacles are moving) and select an optimal driving strategy (e.g., braking, steering, and accelerating) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, etc.), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions outputted by the AVCS 140 can be delivered directly to the powertrain, brakes, and steering 150 (or signaling 170) whereas other instructions outputted by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

Figure 2A:
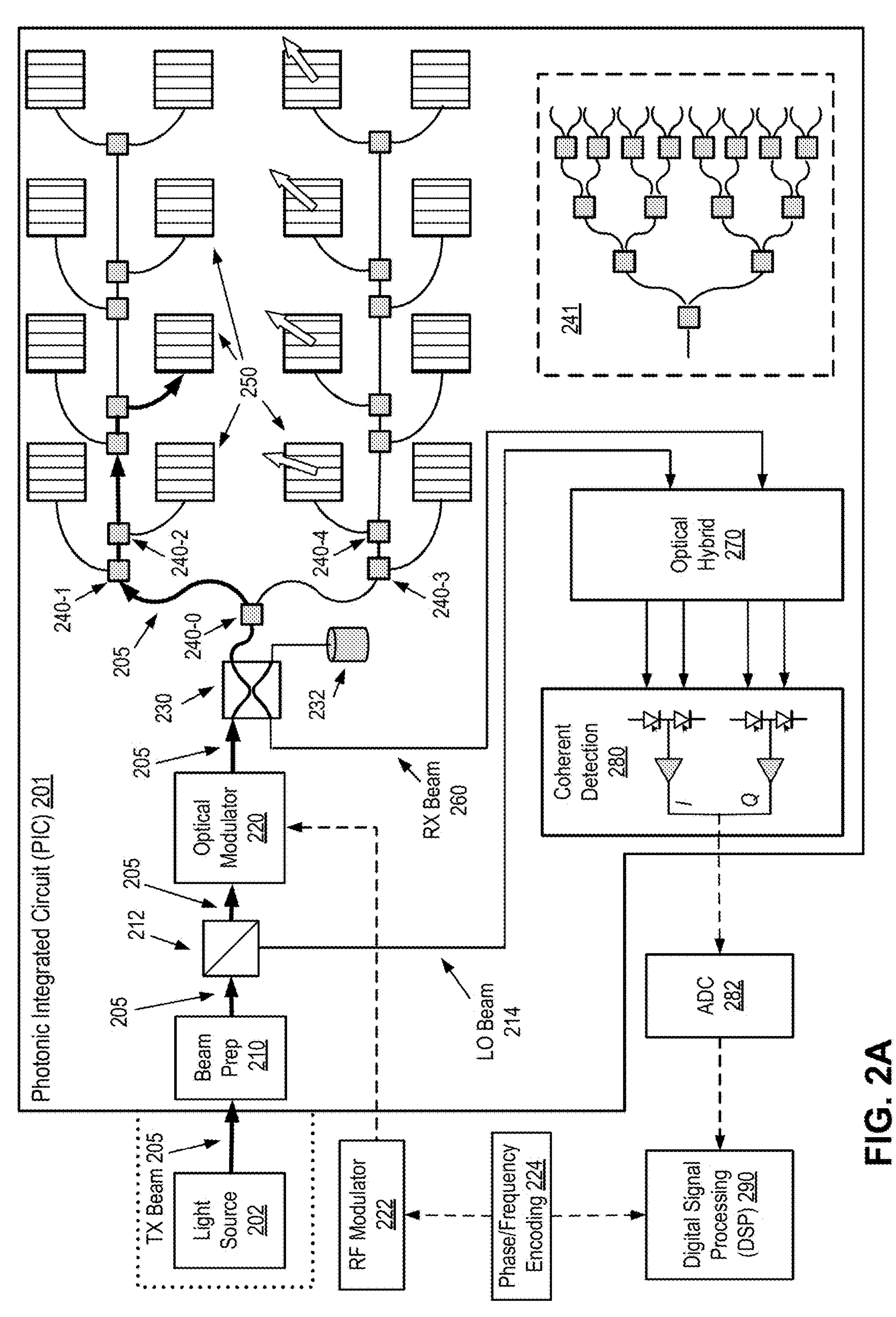
FIG. 2A is a block diagram illustrating an example implementation of an optical sensing system capable of supporting pixel multiplexing and/or polarized beam steering, in accordance with some implementations of the present disclosure.

FIG. 2A is a block diagram illustrating an example implementation of an optical sensing system 200 capable of supporting pixel multiplexing and/or polarized beam steering, in accordance with some implementations of the present disclosure. Optical sensing system 200 can be a part of a (PIC-based) lidar sensor 122. Depicted in FIG. 2A is a light source 202 configured to produce one or more beams of light. "Beams" should be understood herein as referring to any signals of electromagnetic radiation, such as beams, wave packets, pulses, sequences of pulses, or other types of signals. Solid arrows in FIG. 2A (and other figures) indicate optical signal propagation whereas dashed arrows depict propagation of electrical (e.g., RF or other analog) signals or electronic (e.g., digital) signals. Light source 202 can be a broadband laser, a narrow-band laser, a light-emitting diode, and the like. Light source 202 can be a semiconductor laser, a gas laser, an ND:YAG laser, a quantum dot laser, or any other type of a laser. Light source 202 can be a continuous wave laser, a single-pulse laser, a repetitively pulsed laser, a mode locked laser, and the like.

A beam of light produced by light source 202 can be delivered, e.g., via an optical fiber or free space, to PIC 201 for further processing. In some implementations, as depicted with the dotted line, light source 202 can be a light source (e.g., a semiconducting laser, and a laser diode) that is integrated into PIC 201. PIC 201 can perform multiple passive and active optical functions to create one or more signals with desired amplitude, phase, spectral, and polarization characteristics. PIC 201 can include a number of waveguides, beam splitters, couplers, light switches, phase shifters, optical amplifiers, diffraction gratings, grating couplers, photodiodes, and other optical elements. The beam produced by light source 202 can be received by PIC 201 using one or more directional switches, edge couplers, etc., that direct the incoming light within the plane of a chip, e.g., into a silicon (or any other suitable semiconducting material) single-node or multi-node waveguide.

In some implementations, light outputted by light source 202 can be conditioned (pre-processed) by one or more components or elements of a beam preparation stage 210 of the optical sensing system 200 to ensure a narrow-band spectrum, target linewidth, coherence, polarization (e.g., circular or linear), and other optical properties that enable coherent (e.g., Doppler) measurements described below. Although shown as part of PIC 201, in some implementations, some or all operations of beam preparation stage 210 can be performed outside PIC 201 with the preprocessed light being delivered to PIC 201 as described above. Beam preparation can be performed using filters (e.g., narrowband filters), resonators (e.g., resonator cavities, and crystal resonators), polarizers, feedback loops, lenses, mirrors, diffraction optical elements, and other optical devices. For example, if light source 202 is a broadband light source, the output light can be filtered to produce a narrowband beam. In some implementations, in which light source 202 produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on. In some implementations, light source 202 can produce (alone or in combination with beam preparation stage 210) a narrow-linewidth light with a linewidth below 100 KHz. The beam of light produced by beam preparation stage 210 is referred to as a transmitted beam (TX) beam 205, although it should be understood that TX beam 205 can still undergo multiple modifications, as described below (and indicated with thick arrows in FIG. 2A), before being actually transmitted to the outside environment.

TX beam 205 can be delivered to a beam splitter 212 using any suitable waveguide, e.g., a semiconductor waveguide, an insulator waveguide, and the like. Beam splitter 212 splits a portion of TX beam 205 to form a local oscillator (LO) beam 214 that is used as a reference signal to which the signal reflected from a target object is compared. The beam splitter 212 can be a power splitter, a multimode interference splitter, a directional coupler, a waveguide integrated with a subwavelength diffraction grating, or any other suitable device. The beam splitter can be a 90:10 or 80:20 beam splitter with the LO beam 214 carrying a small portion of the total energy of the generated light beam.

An optical modulator 220 can receive the rest of TX beam 205 transmitted by the beam splitter 212 and can impart optical modulation to TX beam 205. "Optical modulation" is to be understood herein as referring to any form of angle modulation, such as phase modulation (e.g., any sequence of phase changes $\Delta\phi(t)$ as a function of time t that are added to the phase of the beam), frequency modulation (e.g., any sequence of frequency changes $\Delta f(t)$ as a function of time t), or any other type of modulation (including a combination of a phase and a frequency modulation) that affects the phase of the wave. Optical modulation is also to be understood to include, where applicable, amplitude modulation $\Delta A(t)$ as a function of time t. Amplitude modulation can be applied to light in combination with angle modulation or separately, without angle modulation.

In some implementations, optical modulator 220 can impart angle modulation to TX beam 205 using one or more RF circuits, such as RF modulator 222, which can include one or more RF local oscillators, mixers, amplifiers, filters, and the like. Even though, for brevity and conciseness, modulation is referred to herein as being performed with RF signals, it should be understood that other frequencies can also be used for angle modulation, including but not limited to Terahertz frequencies, microwave frequencies, and so on. RF modulator 222 can impart optical modulation in accordance with a programmed modulation scheme, e.g., encoded in a sequence of control signals provided by a phase/frequency encoding module (herein also referred to, for simplicity, as encoding module) 224. The control signals can be in an analog format or a digital format. In the latter instances, RF modulator 222 can further include a digital-to-analog converter (DAC) to transform digital control signals to analog form. The encoding module 224 can implement any suitable encoding (keying), e.g., linear frequency chirps (e.g., a chirp-up/chirp-down sequence), pseudorandom keying sequence of phase $\Delta\phi$ or frequency $\Delta f$ shifts, and the like. The encoding module 224 can provide the encoding data to RF modulator 222 that can convert the provided data to RF electrical signals and apply the RF electrical signals to optical modulator 220 that modulates TX beam 205.

In some implementations, optical modulator 220 can include an acousto-optic modulator (AOM), an electro-optic modulator (EOM), a Lithium Niobate modulator, a heat-driven modulator, a Mach-Zehnder modulator, and the like, or any combination thereof. In some implementations, optical modulator 220 can include a quadrature amplitude modulator (QAM) or an in-phase/quadrature modulator (QM). Optical modulator 220 can include multiple AOMs, EOMs, IQMs, one or more beam splitters, phase shifters, combiners, and the like. For example, optical modulator 220 can split TX beam 205 into two beams, modify a phase of one of the split beams (e.g., by a 90-degree phase shift), and pass each of the two split beams through a separate optical modulator to apply angle modulation to each of the two beams using a target encoding scheme. The two beams can then be recombined into a single beam. In some implementations, angle modulation can add phase/frequency shifts that are continuous functions of time. In some implementations, added phase/frequency shifts can be discrete and can take on a number of values, e.g., N discrete values across the phase interval 2 it (or across a frequency band of a predefined width). Optical modulator 220 can add a predetermined time sequence of the phase/frequency shifts to TX beam 205. In some implementations, a modulated RF signal can cause optical modulator 220 to impart to TX beam 205 a sequence of frequency up-chirps interspersed with down-chirps. In some implementations, phase/frequency modulation can have a duration between a microsecond and tens of microseconds and can be repeated with a repetition rate ranging from one or several kilohertz to hundreds of kilohertz. Any suitable amplifier (not shown in FIG. 2A for conciseness) can amplify the modulated TX beam 205.

TX beam 205 modulated by optical modulator 220 can be delivered to a directional coupler 230 that can split TX beam 205 into multiple beams. Directional coupler 230 can be configured to serve as a separator of TX beam 205 and a received (RX) beam 260 generated upon interaction of TX beam 205 with a target in the outside environment. More specifically, rightward (downstream) of directional coupler 230, TX beam 205 and RX beam 260 can follow the same optical path whereas leftward (upstream) of directional coupler 230, TX beam 205 and RX beam 260 can follow different optical paths. In particular, directional coupler 230 can receive TX beam 205 on the coupler's input port and transmit a portion of TX beam 205 towards an optical switch 242. The remaining portion of TX beam 205 outputted by the coupled port of directional coupler 230 can be received by a light stop (absorber) 232. Under ideal conditions, the fourth (isolated) port of directional coupler 230 leaks no or very little light. In some implementations, a suitable optical circulator can perform the function of separating TX beam 205 from RX beam 260 instead of directional coupler 230.

TX beam 205 can then be guided to one or more interface couplers 250 (depicted with large squares) that output TX beam 205 into the outside environment. Although sixteen interface couplers 250 arranged into a 4×4 two-dimensional array of interface couplers are shown in FIG. 2A, any other number of interface couplers can be supported by a single PIC. Guiding of TX beam 205 to interface couplers 250 can be performed using fabric (tree) of optical switches 240-*n*. For example, as illustrated in FIG. 2A, optical switch 240-0 can direct the TX beam 205 only towards the top half of the array of interface couplers 250, only towards the bottom half of interface couplers 240, or both toward the top half and the bottom half of the array. The pair of optical switches 240-3 and 240-4 can similarly direct (in conjunction with the respective downstream optical switches) the TX beam 205 towards any one or more of interface couplers 250 belonging to the bottom half of the array. As a result, controlled operations of various optical switches 240-*n* can deliver TX beam 205 to any one, two, three, or any other number (up to the total number) of the interface couplers 250 supported by PIC 201. The topology of the fabric of optical switches 240-*n* is merely an example topology and various other topologies can be used, e.g., the topology of fabric 241 shown in the dashed box insert in FIG. 2A. In some implementations, the fabric of optical switches 240-*n* can include optical amplifiers (not shown for conciseness in FIG. 2A), which can be used to compensate for reduction in the power when TX beam 205 is delivered to multiple interface couplers 250 at once. The amplifiers can be positioned between different optical switches 240-*n* and/or between optical switches 240-*n* and interface couplers 250. The amplifier(s) can be active gain medium amplifiers, semiconductor optical amplifiers (e.g., doped-semiconductor amplifiers), parametric amplifiers, and the like, or some combination thereof.

In some implementations, optical switches 240-*n* can be of Mach-Zehnder interferometer type. For example, TX beam 205 inputted into an optical switch, e.g., optical switch 240-0, can be split into two (or more) arms, e.g., with each arm carrying an equal portion of the input beam's power. Each arm can include a waveguide that is independently heated by a heating electrode. The refractive index of the waveguide's medium can be sensitive to temperature. As a result, each waveguide equipped with the heating electrode modifies the wavelength of the light propagating in the waveguide and, therefore, performs the function of a phase controller (phase shifter) and causes one of the arms of the input beam to acquire a controlled phase shift. The heating signal can be of such magnitude that when the two arms recombine (e.g., in a 2×2 output coupler), the arms interfere constructively for the path leading towards optical switch 240-1 and interfere destructively for the path leading towards optical switch 244-3 (or vice versa). Other optical switches 240-*n* can operate in a similar fashion. In some implementations, any of optical switches 240-*n* can be electro-optic (rather than thermo-optic switches), operating based on the sensitivity of the refractive index to the applied electric field (rather than heat). In the instance where no heating current (or electric field) is delivered to a specific optical switch, that optical switch can operate as a beam splitter (one-to-two power splitter) and divide the power equally between two output ports of the optical switch. FIG. 2A illustrates TX beam 205 being delivered to one of the interface couplers 250, but the number of interface couplers 250 receiving TX beam 205 need not be limited (other than by the total number of interface couplers on PIC 201).

Each interface coupler 250 can be positioned (or otherwise configured, by having slightly different properties, e.g., diffraction grating spacing or pitch) to point TX beam 205 (or a portion of TX beam) along a different direction in the outside environment (as depicted schematically with open arrows in the third row of interface couplers). In some implementations, interface couplers 250 can be grating couplers, mirror couplers, or any other suitable directional switches configured to direct TX beams along the desired directions in space. Each interface coupler 250 can, therefore, implement a different sensing pixel corresponding to a respective spatial direction probed by optical sensing system 200.

Figure 4A:
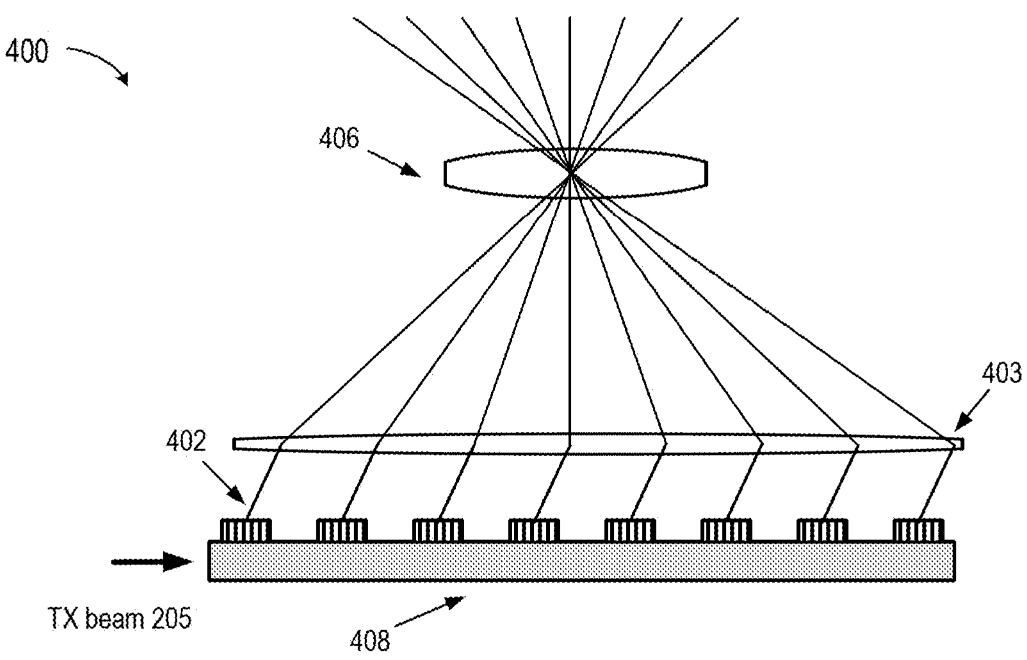
FIGS. 4A-4B illustrate example interface coupling devices that use an intermediate optical element to redirect light scattered by an array of interface couplers for efficient pixel multiplexing in an optical sensing system, in accordance with some implementations of the present disclosure.
Figure 4B:
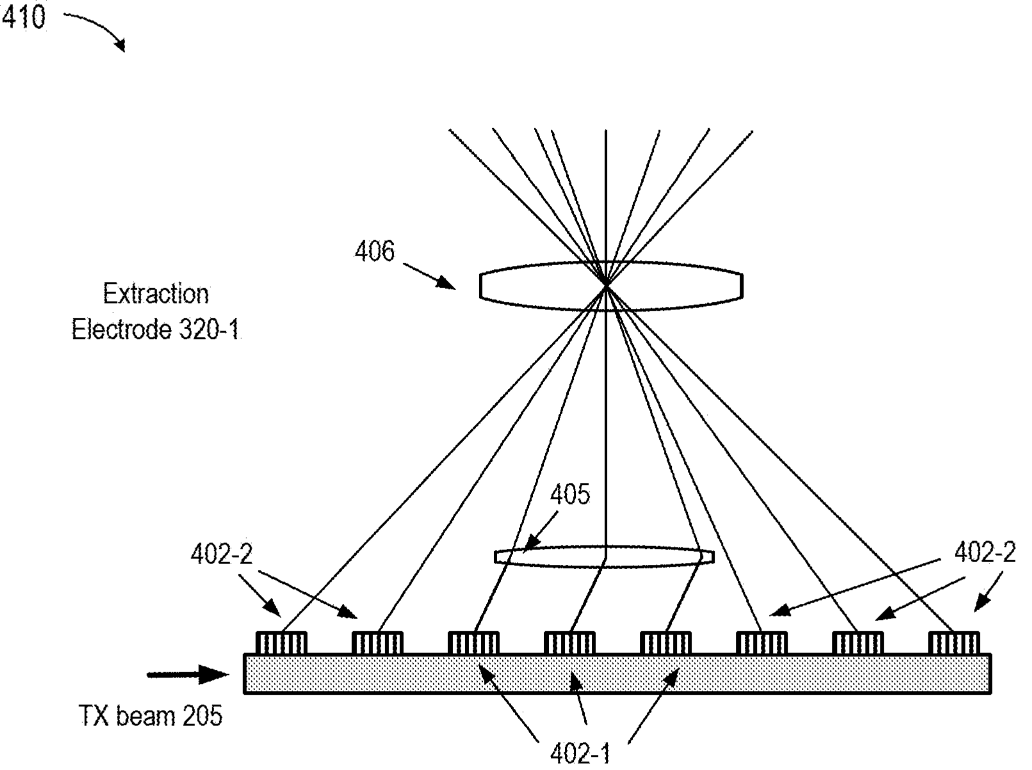
Figure 5:
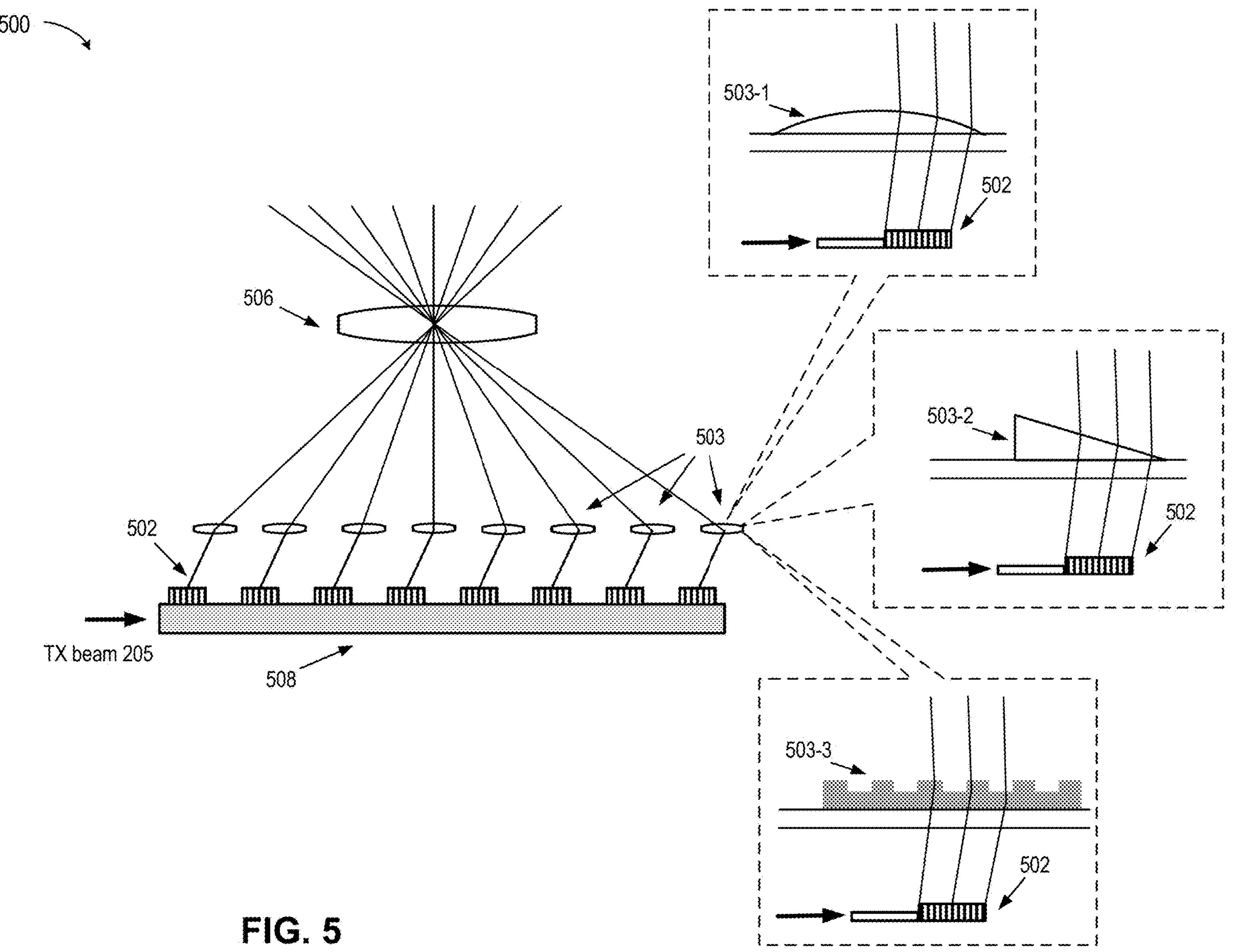
FIG. 5 illustrates an example interface coupling device that uses multiple intermediate optical elements to redirect light scattered by an array of interface couplers for efficient pixel multiplexing in an optical sensing system, in accordance with some implementations of the present disclosure.

In a monostatic configuration, each interface coupler 250 can include one coupling element that serves as both the TX antenna (outputting TX beam 205 or its portion) and the RX antenna (receiving a beam reflected from a target), e.g., as illustrated in FIGS. 3-5. In a bistatic configuration, each interface coupler 250 can include multiple coupling elements, e.g., one element that serves as the TX antenna and a different element that serves as the RX antenna. In a quasi-monostatic configuration, each interface coupler 250 can include a separate TX antenna and an RX antenna, but can include additional optical elements that merge TX beam and RX beam optical paths for light propagation to the target and back in the outside space, e.g., as further illustrated in FIGS. 6A-6D. Additionally, each interface coupler 250 can include waveguides, lenses, microprisms, mirrors, diffraction gratings, polarizers, half plates, quarter plates, and other elements. Some of these elements can be integrated on PIC 201 whereas other elements, as described in more detail below, can be located outside the plane of PIC 201, e.g., with the light delivered to such elements over free space. Different interface couplers 250 can share some of the optical elements, e.g., an objective lens, various diffractive optical elements, polarizers, and so on.

Each interface coupler 250 can collect a separate RX beam, which can be reflected by different objects (e.g., if the objects are located far away from sensing system 200) or by different regions of the same object (e.g., if objects are closer). Interface couplers 250 and the fabric of optical switches 240-*n* can then combine separate RX beams into a single RX beam 260. More specifically, each received beam can retrace the path of the corresponding TX beam through the fabric of optical switches 240-*n* (while being combined at each optical switch with other received beams) until the received beams are separated from TX beam 205 by directional coupler 230. Directional coupler 230 can direct the combined RX beam 260 to optical hybrid stage 270 whose second input can be LO beam 214. Optical hybrid stage 270 can perform pre-conditioning of the input beams prior to processing by a coherent detection stage 280. In some implementations, optical hybrid stage 270 can be a 180-degree hybrid stage capable of detecting an absolute value of a phase difference of the input beams. In some implementations, optical hybrid stage 270 can be a 90-degree optical hybrid stage capable of detecting both the absolute value and a sign of the phase difference of the input beams. For example, in the latter case, optical hybrid stage 270 can be designed to split each of the input beams into multiple copies (e.g., four copies, as depicted). Optical hybrid stage 270 can apply controlled phase shifts (e.g., 90°, 180°, 270°) to some of the copies, e.g., copies of LO beam 214, and mix the phase-shifted copies of LO beam 214 with other RX beam 260, whose electric field is denoted with $E_{RX}$. As a result, the optical hybrid stage 270 can produce the in-phase symmetric and anti-symmetric combinations $(E_{RX}+E_{LO})/2$ and $(E_{RX}-$ $E_{LO}$)/2 of the input beams, and the quadrature 90-degree-shifted combinations ($E_{RX}$+i$E_{LO}$)/2 and ($E_{RX}$−i$E_{LO}$)/2 of the input beams (i being the imaginary unit number).

The coherent detection stage 280 receives four input combinations of $E_{RX}$ and $E_{LO}$ (in case of a 90-degree optical hybrid stage 270) or two combinations $E_{RX}\pm E_{LO}$ (in case of a 180-degree optical hybrid stage 270). The coherent detection stage 280 then processes the received inputs using one or more coherent light analyzers, such as balanced photodetectors, to detect phase information carried by RX beam 260. A balanced photodetector can have photodiodes connected in series and can generate ac electrical signals that are proportional to a difference of intensities of the input optical modes (which can also be pre-amplified). A balanced photodetector can include photodiodes that are Si-based, InGaAs-based, Ge-based, Si-on-Ge-based, and the like (e.g. avalanche photodiode). In some implementations, balanced photodetectors can be manufactured on a single chip, e.g., using complementary metal-oxide-semiconductor (CMOS) structures, silicon photomultiplier (SiPM) devices, or similar systems. In the implementation depicted in FIG. 2A, the LO beam 214 is unmodulated, but it should be understood that in other implementations consistent with the present disclosure, LO beam 214 can be modulated. For example, optical modulator 220 can be positioned between beam preparation stage 210 and beam splitter 212 to modulate LO beam 214.

Each of the input signals can then be received by respective photodiodes connected in series. An in-phase electric current I can be produced by a first pair of the photodiodes and a quadrature current Q can be produced by a second pair of photodiodes. Each of the currents can be further processed by one or more operational amplifiers, intermediate frequency amplifiers, and the like. The in-phase/and quadrature Q currents can then be mixed into a complex photocurrent whose AC part $$J = \left|\frac{E_{RX}+E_{LO}}{2}\right|^2 - \left|\frac{E_{RX}-E_{LO}}{2}\right|^2 + \left|\frac{E_{RX}+iE_{LO}}{2}\right|^2 - \left|\frac{E_{RX}+iE_{LO}}{2}\right|^2 = E_{RX}E_{LO}^*$$

is sensitive to both the absolute value and the sign of the phase difference of $E_{RX}$ and $E_{LO}$.

Similarly, a 180-degree optical hybrid can produce only the in-phase photocurrent whose AC part $$J = \left|\frac{E_{RX}+E_{LO}}{2}\right|^2 - \left|\frac{E_{RX}-E_{LO}}{2}\right|^2 = ReE_{RX}E_{LO}^*$$

is sensitive to the absolute value of the phase difference but not the sign of this phase difference.

The digitized signal $J(t)=E_{Ref}(t)E_{LO}{}^*(t)$ is representative of a beating pattern between the LO beam 214 and RX beam 260 reflected from an object in the outside environment. More specifically, RX beam 260 $E_{RX}(t)$ received by the optical sensing system 200 at time t was transmitted to the target at time t−τ, where τ=2L/c (the delay time) is the time of photon travel to the target located at distance L and back. DSP 290 can correlate the phase modulation in the digitized signal J(t) with the phase and/or frequency encoding (the encoding scheme can be obtained from encoding module 224) and determine the time of flight t based on the time offset that ensures the optimal match between the two modulations. The distance to the object is then determined as L=cτ/2. The radial velocity of the object can be determined based on the Doppler shift $f_D$ of the carrier frequency $f+f_D$ of the reflected beam compared with the frequency f of LO beam 214: $V=cf_D/(2f)$. DSP 290 can extract the distance and velocity information for each of the reflected beams (pixels) received through a respective interface coupler 250. As a result, multiple objects can potentially be imaged by optical sensing system 200 concurrently.

DSP 290 can include spectral analyzers, such as Fast Fourier Transform (FTT) analyzers, and other circuits configured to process digital signals, including central processing units (CPUs), graphic processing units (GPUs), field-programmable gate arrays (FPGAs), application-specific integrated circuits (ASICs), etc., and memory devices. In some implementations, the processing and memory circuits can be implemented as part of a microcontroller.

Multiple variations of the optical sensing system 200 are within the scope of the present disclosure. For example, if optical hybrid stage 270 is a 180-degree optical hybrid, the in-phase electrical signal generated by coherent detection stage 280 can be agnostic about the sign of $f_D$ as Doppler-shifted beams with frequencies $f+f_D$ and $f-f_D$ result in the same in-phase signals. To eliminate the symmetry between the positive and negative Doppler shifts, a frequency offset $f_{off}$ can be imparted to the TX beam 205 (or, alternatively, to LO beam 214). This disambiguates reflections from objects moving with opposite velocities +V and −V by causing the beatings between $E_{RX}(t)$ and $E_{LO}(t)$ to occur with frequencies $f_{off}-f_D$ and $f_{off}+f_D$, having different absolute values. The offset frequency $f_{off}$ can be applied to TX beam 205 (or LO beam 214) by an optical modulator 220 and/or additional optical modulator not shown in FIG. 2A.

Figure 2B:
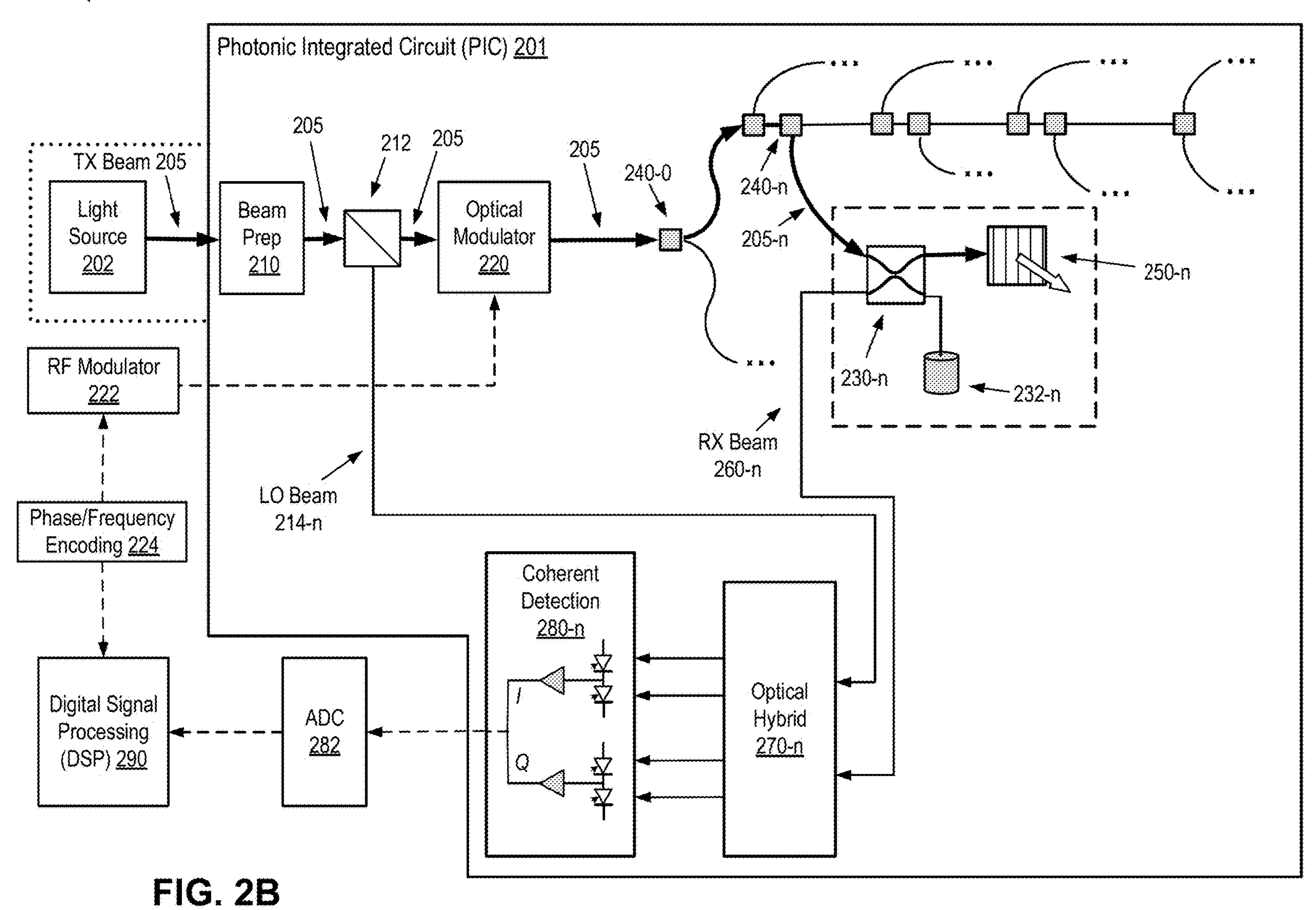
FIG. 2B is a block diagram illustrating another example implementation of an optical sensing system capable of supporting pixel multiplexing and/or polarized beam steering, in accordance with some implementations of the present disclosure.

FIG. 2B is a block diagram illustrating another example implementation of an optical sensing system 299 capable of supporting pixel multiplexing and/or polarized beam steering, in accordance with some implementations of the present disclosure. As shown in FIG. 28, each interface coupler 250-*n* may be supported with individual directional coupler 230-*n* (and light stop 232-*n*) that directs TX beam 205-*n* from respective optical switch 240-*n* to the interface coupler 250-*n* and receives RX beam 260-*n* reflected from a target. For brevity and conciseness, FIG. 2B illustrates operations of a single interface coupler 250-*n* but various other interface couplers may be operated in the same way. In some implementations, each RX beam 260-*n* received via interface coupler 250-*n* and directional coupler 230-*n* may be processed by a dedicated coherent detection stage 280-*n* (and an optical hybrid stage 270-*n*). In some implementations, coherent detection stage 280-*n* may receive a separate copy of LO beam 214-*n*, which may be obtained from a base LO beam via a second optical switch fabric (not shown in FIG. 2B).

FIG. 2A and FIG. 2B depict a single set of photodiodes of the coherent detection stage 280 analyzing the combined RX beam, with the separation of signals reflected from different objects being performed in the digital domain by DSP 290. In some implementations, an RX beam received by each interface coupler 250 can be processed by a separate set of photodiodes, e.g., using a separate copy of LO beam 214 obtained with an additional fabric of beam splitters similar to fabric 241. Each set of photodiodes can generate a separate current J which can then be processed by DSP 290. In some implementations, each set of photodiodes can process a combined RX beam collected from a group of two, three, four, etc., interface couplers 250.

PICs deployed in various implementations disclosed in conjunction with FIGS. 1-6 (or other similar systems and components) can be implemented on a single chip (substrate), e.g., Silicon chip, Silicon Oxide chip, Indium Phosphide chip, Silicon Nitride chips, diamond-based chips, and the like, and can integrate multiple optical elements and functions. PICs can be manufactured using multiple materials, e.g., III-V compound semiconductors (GaAs, InSb, etc.) integrated with Silicon or Germanium. The chip can be manufactured using any suitable methods of lithography, epitaxy, physical vapor deposition, chemical vapor deposition, plasma-assisted deposition, or any other suitable techniques of wafer-scale technology. PICs can operate in the visible light domain (300-700 nm wavelength) or in the infrared domain (above 1000 nm). PICs can include components designed and manufactured to generate light, guide light, manipulate light by changing amplitude, frequency, phase, polarization, spatial and temporal extent of light, transform energy of light into other forms, such as energy of electric current, energy of mechanical vibrations, heat and the like.

PICs can include any number of integrated light sources, such as light-emitting diodes (LEDs), semiconductor lasers diodes, quantum dot lasers (e.g., quantum dot lasers monolithically grown on Silicon), Germanium-on-Silicon lasers, Erbium-based lasers, Raman lasers, integrated III-V compound semiconductors on Si substrate, and the like. In some implementations, PICs can operate on light generated by lasers and other light sources located off-chip and delivered to PICs via any number of optical switches and optical fibers.

PICs can include any number of waveguides, which can serve as elemental building blocks of a PIC's light transportation system, connecting various elements and components. Waveguides can include metallic waveguides, dielectric waveguides, doped semiconductor waveguides, and the like. Waveguides can be single-mode waveguides or multimode waveguides. Waveguides can be passive waveguides or active waveguides with gain medium, which can increase the amplitude of the light guided therethrough. Dielectric waveguides can be engineered with high refractive index layers surrounded by lower refractive index materials, which can be deposited and shaped to a designed form using deposition and etching manufacturing techniques.

PICs can include any number of beam splitters, e.g., power splitters, beam combiners, directional couplers, grating couplers, and the like. PICs can include optical circulators, e.g., Faraday effect-based circulators, birefringent crystal-based circulators, and so on. PICs can include any number of optical amplifiers, such as Erbium-doped amplifiers, waveguide-integrated amplifiers, saturation amplifiers, and the like. PICs can further include any number of phase shifters, such as optomechanical phase shifters, electro-optical phase shifters, e.g., shifters operating by exercising electrical or mechanical control of the refractive index of an optical medium, and the like.

PICs can include any number of optical modulators, including indium phosphide modulators, Lithium Niobate modulators, Silicon-based modulators, acousto-optic modulators, electro-optic modulators, electro-absorption modulators, Mach-Zehnder modulators, and the like. In some implementations, optical modulators can use carrier injection, radiation amplification, and other techniques. Optical modulators can include various optomechanical components, e.g., components that modulate the refractive index of a waveguide due to the displacement of a mechanically moveable part placed next to the waveguide, which in turn induces a phase shift (or a directional shift) to the propagating light field.

PICs can include any number of single-photon detectors, e.g., superconducting nanowire single-photon detectors (SNSPDs) or superconducting film single-photon detectors, which can be integrated with diamond or silicon substrates. PICs can include any number of interferometers, such as Mach-Zehnder interferometers.

PICs can include any number of multiplexers/demultiplexers, including wavelength division multiplexers/demultiplexers, phased-array wavelength multiplexers/demultiplexers, wavelength converters, time division multiplexers/demultiplexers, and the like.

PICs can further include any number of photodetectors, including silicon photomultipliers, photodiodes, which can be Silicon-based photodiodes, Germanium-based photodiodes, Germanium-on-Silicon-based photodiodes, III-V semiconductor-based (e.g., GaAs-based) photodiodes, avalanche photodiodes, silicon photomultipliers (SiPMs), and so on. Photodiodes can be integrated into balanced photodetector modules, which can further include various optical hybrids, e.g., 90-degree hybrids, 180-degree hybrids, and the like.

Figures 3A, 3B:
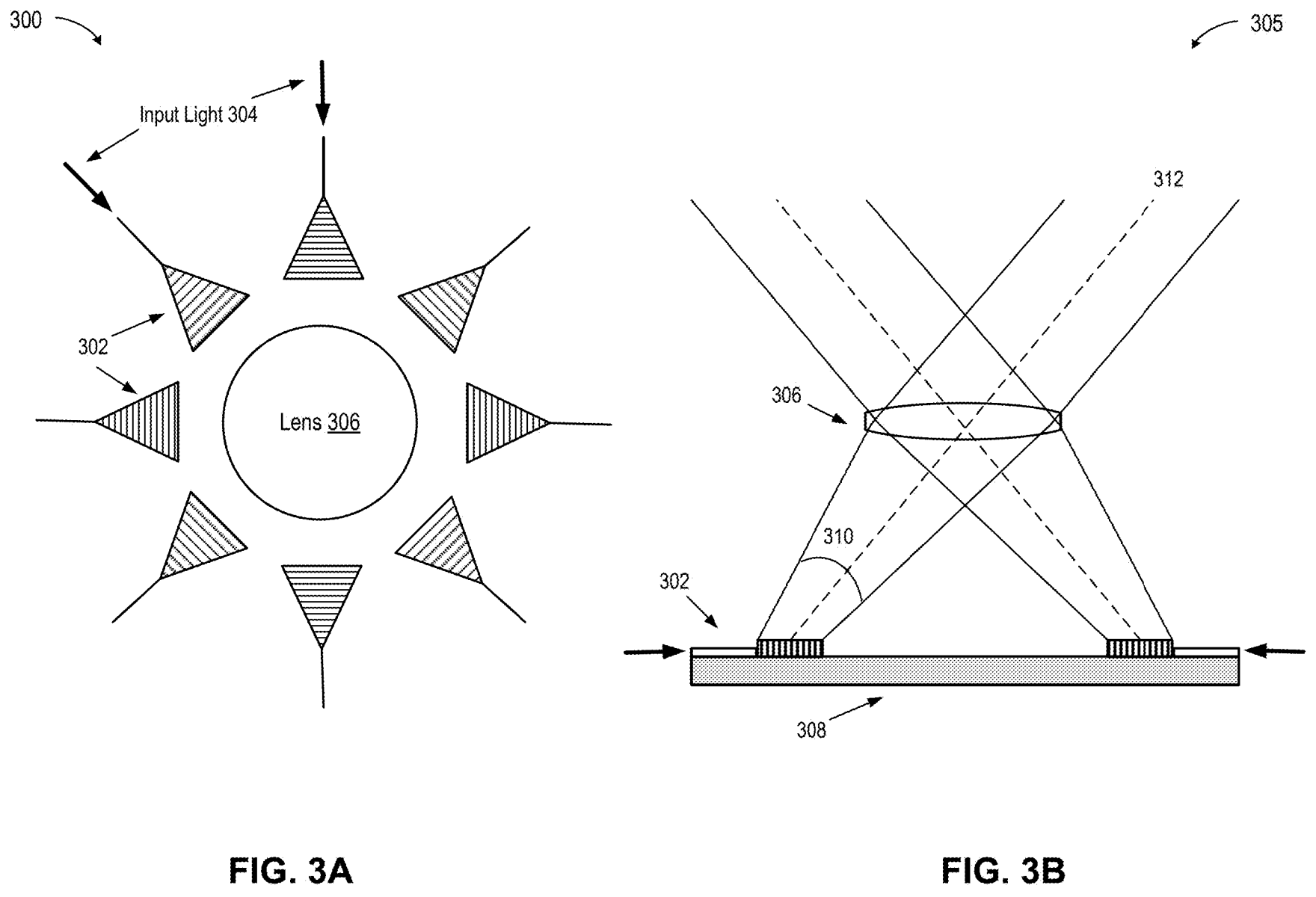
Figures 3C, 3D:
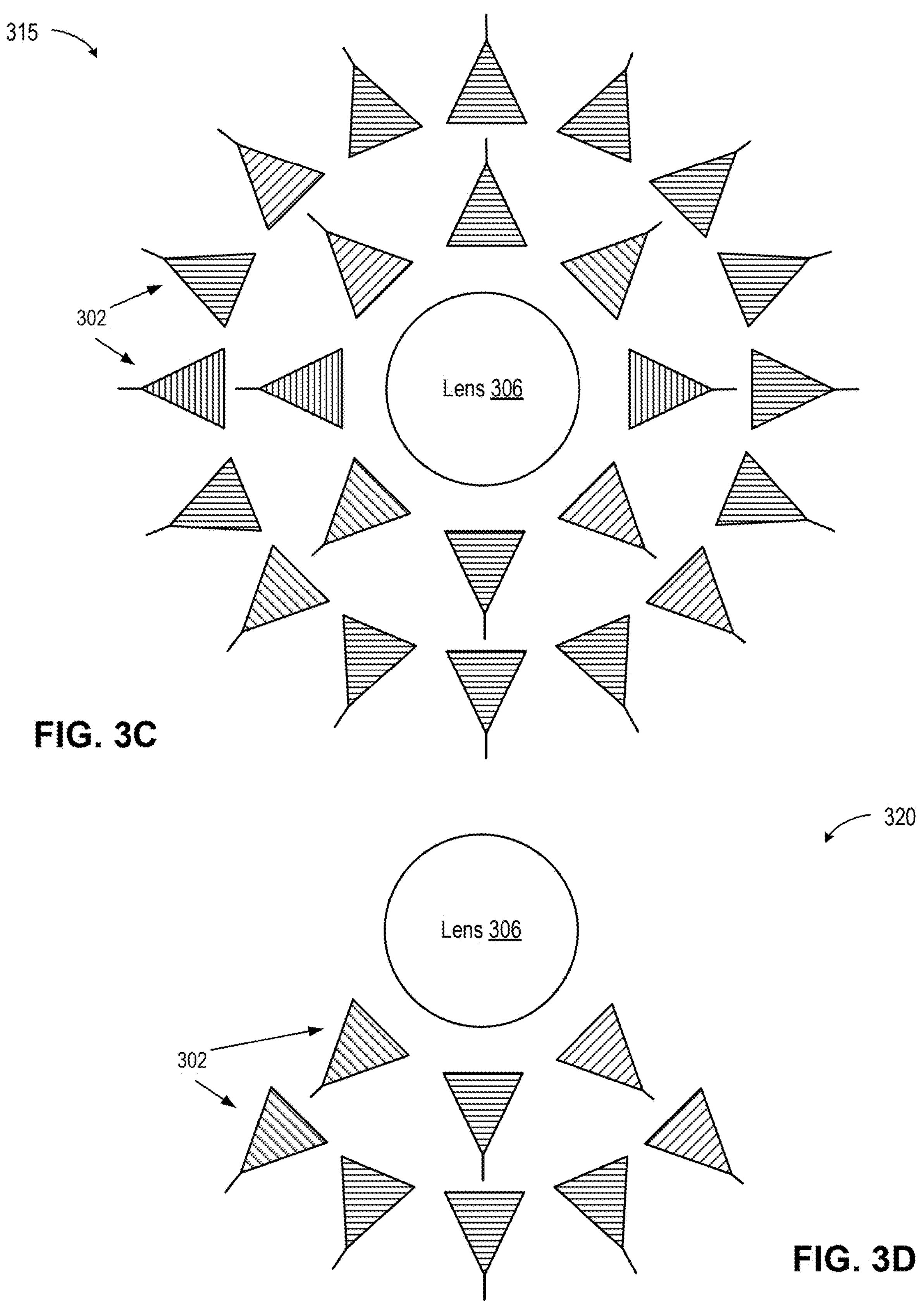

FIGS. 3A-3D illustrate example architecture and operations of an interface coupling device that uses positioning of multiple interface couplers around a curve in the plane of a PIC for efficient pixel multiplexing in an optical sensing system, in accordance with some implementations of the present disclosure. FIG. 3A illustrates a top view 300 of a set of interface couplers 302 positioned within the plane of the PIC around a circle. Interface couplers 302 can receive input light 304, e.g., portions or copies of TX beam 205, propagating within the plane of the PIC. Interface couplers 302 can scatter the input light 304 out of the plane of the PIC and in the direction of lens 306, e.g., an objective lens. Lens 306 can then transmit the light toward one or more target objects in outer space. FIG. 3B illustrates a side view 305 of the interface coupling device of FIG. 3A. Interface coupler 302 scatters input light 304 into a scattering cone 302 towards lens 306 that redirects the scattered light along a specific direction 312 in space. As illustrated in FIGS. 3A-3B, the arrangement of interface couplers 302 has multiple advantages. Each interface coupler 302 scatters light into a cone of angles that are substantially different (e.g., by 10 degrees or more) from the normal to the plane of the PIC substrate 308, ensuring that backreflection of input light 304 from interface coupler 302 is minimized or reduced. Furthermore, each interface coupler 302 can have the same size, design and characteristics (e.g., diffraction grating pitch), which simplifies PIC manufacturing. The scattering cone of each interface coupler 302 is oriented in substantially the same way relative to lens 306, eliminating the need for a special anisotropic design of lens 306. Additionally, the directions of radiation of different interface couplers 302 are substantially different, enabling the optical sensing system to probe multiple spatial directions simultaneously.

Interface couplers 302 can be any optical elements capable of redirecting input light 304 away from the plane of substrate 308, including but not limited to diffractive optical elements (DOEs), which can be a diffraction grating, a spatial light modulator, a holographic plate, a vortex wave plate, and the like. Interface couplers can include a mirror, a prism, an edge coupler (e.g., a tapered waveguide) with an opening tilted in the direction of lens 306, and so on. Diffraction gratings can include optical slab waveguides (e.g., insulating, conducting, or semiconducting waveguides) with periodically etched grooves or deposited ridges of the same or different material than the material of the waveguide. The spacing (pitch) a of the grooves/ridges can be such that the constructive interference condition is satisfied for two adjacent grooves/ridges for the scattering (diffraction) of light at a target angle θ to the normal direction of substrate 308, e.g., $$\frac{a}{\lambda}(n-\sin\theta)=m,$$

where λ is the wavelength of light in free space, n is the refractive index of the waveguide, and m is any integer number, e.g., m=0 for the main maximum, m=±1 for the first side maxima, and so on.

Interface couplers 302 can further include micromirrors with reflecting facets positioned at an angle that ensures scattering (reflection) of light along a desired direction towards lens 306. To reduce retro-reflections, surfaces of the micromirrors can be coated with anti-reflection coatings.

Multiple variations of the interface coupling system are within the scope of the present disclosure. In some implementations, interface couplers 302 can be arranged around a curve that is different from a circle, e.g., an ellipse, or some other suitable curve. In some implementations, more than a single circular (or some other) array of interface couplers can direct light to a single lens. FIG. 3C illustrates a two-dimensional arrangement of twenty-four interface couplers positioned around two concentric rings and directing light to a single lens 306, in accordance with some implementations. In some implementations, interface couplers can be arranged around some portion of a curve. FIG. 3D illustrates a two-dimensional arrangement of eight interface couplers positioned within a segment of two concentric rings and directing light to a single lens 306, in accordance with some implementations.

It should be understood that FIGS. 3A-3D aim to illustrate basic operations of an interface coupling system that uses circular (or any other curved) arrays of interface couplers and are not intended to show exhaustively all possible components of such a system. In addition to various components shown in FIGS. 3A-3D, an interface coupling system can include other lenses (e.g., focusing lenses, collimating lenses, curved mirrors), apertures, field stops, polarizers, and the like. In some implementations, a curved mirror (or a set of two or more mirrors) can be used in lieu of lens 306.

FIGS. 4A-4B illustrate example interface coupling devices that use an intermediate optical element to redirect light scattered by an array of interface couplers for efficient pixel multiplexing in an optical sensing system, in accordance with some implementations of the present disclosure. FIG. 4A depicts a portion of interface coupling device 400 in which TX beam 205 propagates within the plane of a PIC, e.g., in a waveguide 408, which can be made of a semiconducting material, e.g., silicon, or any other transparent to light semiconducting or insulating material with a high refractive index (e.g., ≥2). Interface couplers 402 can be positioned along the waveguide 408 (e.g., at regularly spaced locations). Although in the cross-sectional view of FIG. 4A, only one linear array of interface couplers 402 is visible, interface coupling device 400 can deploy multiple linear arrays of interface couplers 402, e.g., arranged in a two-dimensional matrix. A separate waveguide can deliver TX beam 205 (or a portion or copy of TX beam 205) to each such array of the interface couplers.

Each interface coupler 402 can scatter light in a direction (e.g., chief ray direction) that is tilted away from the normal (vertical) direction of the PIC, e.g., by 5 degrees, 10 degrees, or more. As illustrated in FIG. 4A, some of the light rays can be directed away from a lens 406 and its optical axis. An intermediate optical element, e.g., lens 403, can operate as a field lens by increasing the field of view of lens 406. In some implementations, the field lens can be a conventional lens, a Fresnel lens, a compound lens, and so on. In some implementations, the field lens can be displaced laterally relative to the optical axis of lens 403 to compensate for the tilt of the scattered light. In some implementations, the field lens can have the focal length that is equal (or approximately equal) to the distance between lens 406 and the intermediate optical element(s), e.g., lens 403. (It should be understood that the dimensions of FIG. 4A as well as those of any other figures of this disclosure are not necessarily to scale.) As a result, the intermediate optical element can redirect light scattered by interface couplers 402 towards lens 406, which then directs the light to the outer space, with the light from each interface coupler 402 probing (sensing) a separate direction of the outer space. For simplicity, only a chief ray for each interface coupler 402 is shown in FIG. 4A and it should be understood that each interface coupler 402 scatters TX beam 205 into a finite-sized interval (e.g., cone) of angles.

Each interface coupler 402 can operate as a monostatic light transceiver, by also detecting an RX beam reflected from a target that is hit by the respective transmitted beam. The RX beams collected by individual interface couplers 402 can then be processed individually or combined into a single RX beam before processing, e.g., as described in more detail in conjunction with FIG. 2A and FIG. 2B.

FIG. 4B depicts a variation of the optical interface device of FIG. 4A, in which an intermediate optical element is used to redirect only a light scattered by a fraction of interface couplers. More specifically, in the implementation of FIG. 4A, different interface couplers 402 can have the same or close (e.g., within the tolerances of the PIC-manufacturing process) characteristics and, therefore, can scatter light in substantially the same direction. The interface coupling device 410 of FIG. 4B can use interface couplers of two different classes. Those interface couplers 402-1 that are located within a region adjacent to the optical axis of lens 406 can be manufactured according to the same specification. For example, interface couplers 402-1 can scatter (or reflect) light along a direction that is tilted, relative to the optical axis, to a sufficient angle $\theta_{min}$ (e.g., 10 degrees, and 20 degrees) that facilitates strong scattering of light along the desired direction while also reducing the power of the light backscattered (retro-reflected) into waveguide 408. Light scattered by interface couplers 402-1 can be redirected closer to the optical axis of lens 406 using an intermediate optical element, e.g., field lens 405, which functions similar to field lens 403 of FIG. 4A. Interface couplers 402-2, located farther away from the optical axis of lens 406 can scatter TX beam 205 along directions that make sufficiently large angles with the normal direction of the PIC (which can also be the direction of the optical axis of lens 406). Interface couplers 402-2 can be manufactured to individual specifications and can scatter TX beam 205 directly toward lens 406 without intermediate optical elements. In particular, the scattering angle for each interface coupler 402-2 can be manufactured (e.g., by controlling the pitch of a diffraction grating) based on the lateral offset of the respective interface coupler relative to the optical axis. The radius of lens 405 can be determined in view of the minimum angle $\theta_{min}$ that the scattered light is to make with the normal direction, e.g., R=d tan $\theta_{min}$, where d is the distance from lens 405 to lens 406. Interface couplers located closer than R to the optical axis can be interface couplers 402-1 while interface couplers located farther away than R from the optical axis can be interface couplers 402-2. The interface coupling device 400 of FIG. 4A has an advantage of simpler PIC manufacturing whereas the interface coupling device 410 of FIG. 4B uses a smaller intermediate lens, which can reduce the cost of the device.

FIG. 5 illustrate example interface coupling device 500 that uses multiple intermediate optical elements to redirect light scattered by an array of interface couplers for efficient pixel multiplexing in an optical sensing system, in accordance with some implementations of the present disclosure. FIG. 5 depicts a portion of interface coupling device 500 in which TX beam 205 propagates within the plane of a PIC (e.g., in the waveguide 508) and is scattered away from that plane by a plurality of interface couplers 502 positioned along the waveguide 508 (e.g., at regularly spaced locations). Although in the cross-sectional view of FIG. 5 only one linear array of interface couplers 502 is visible, interface coupling device 500 can deploy multiple linear arrays of interface couplers 502 arranged in a two-dimensional matrix. A separate waveguide can deliver TX beam 205 (or a portion or copy of TX beam 205) to each such array of the interface couplers.

Each interface coupler 502 can scatter light in a direction that is tilted away from the normal (vertical) direction of the PIC, e.g., by 5 degrees, 10 degrees, or more. Rather than deploying a single intermediate optical element to focus light scattered by different interface couplers (e.g., as illustrated in FIG. 4A), an optical interface system 500 makes use of a plurality of individual intermediate optical elements 503, each element serving a specific interface coupler 502. Each intermediate optical element 503 can be configured to receive the light arriving from the respective interface coupler 502 and redirect this light towards lens 505 by an individually computed angle that is based on the lateral location of the respective interface coupler.

FIG. 5 further illustrates some non-limiting examples of the intermediate optical elements. The top blowout portion of FIG. 5 illustrates a microlens 503-1 used as part of an array of individual intermediate optical elements 503. In some implementations, each microlens can be 10-100 microns in diameter although smaller (e.g., down to 1 micron size or even less) or larger microlenses can also be used. The middle blowout portion of FIG. 5 illustrates a microprism 503-2 used as part of an array of individual intermediate optical elements 503. Microprisms 503-2 can be of a similar size as microlenses 503-1. The bottom blowout portion of FIG. 5 illustrates a diffraction grating 503-3 used as part of an array of individual intermediate optical elements 503. Diffraction gratings 503-3 can be volume holographic gratings, surface relief gratings, or any other suitable diffraction gratings. In some implementations, diffraction gratings 503-3 can be high-efficiency single-order diffraction gratings with the maximum intensity of scattering (diffraction) in the direction of lens 506 with the scattering angle computed and manufactured for a specific lateral offset of the respective interface coupler 502. In some implementations, an array of microlenses 503-1, an array of microprisms 503-2, and/or an array of diffraction gratings 503-3 can be embedded within a cladding (insulating) layer of the PIC and manufactured together with the PIC, e.g., using nanolithography techniques, as part of a single processing chamber operation (or a series of such operations). In some implementations, an array of microlenses 503-1, an array of microprisms 503-2, and/or an array of diffraction gratings 503-3 can be manufactured separately and then affixed to the surface of the PIC. In some implementations, some of the intermediate optical elements 503 can be of one type (e.g., microlenses) while others can be of a different type (e.g., diffraction gratings).

Figure 6A:
FIGS. 6A-6D illustrate example interface coupling devices that use polarization multiplexing in a quasi-monostatic configuration in an optical sensing system, in accordance with some implementations of the present disclosure.
Figure 6A:
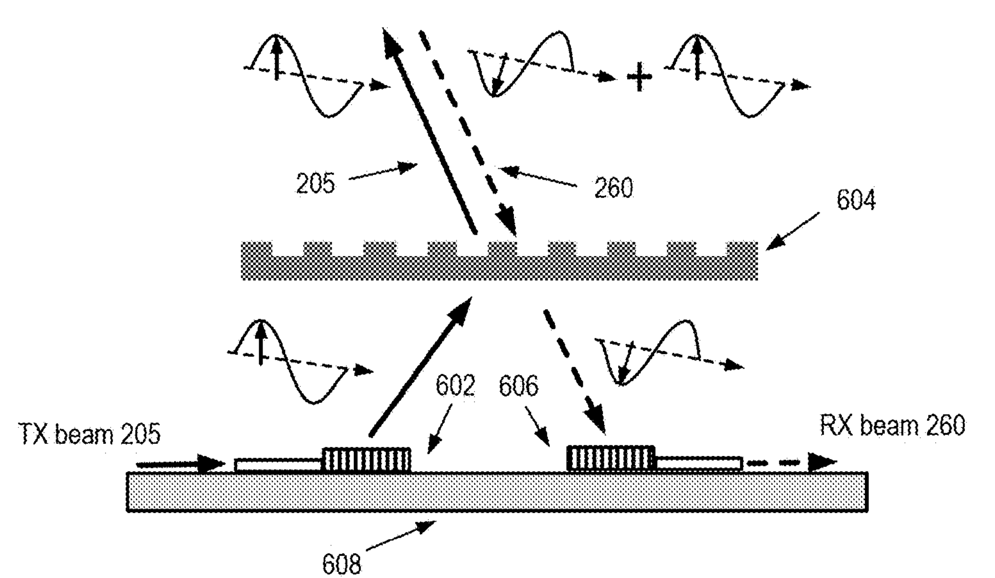
Figure 6B:
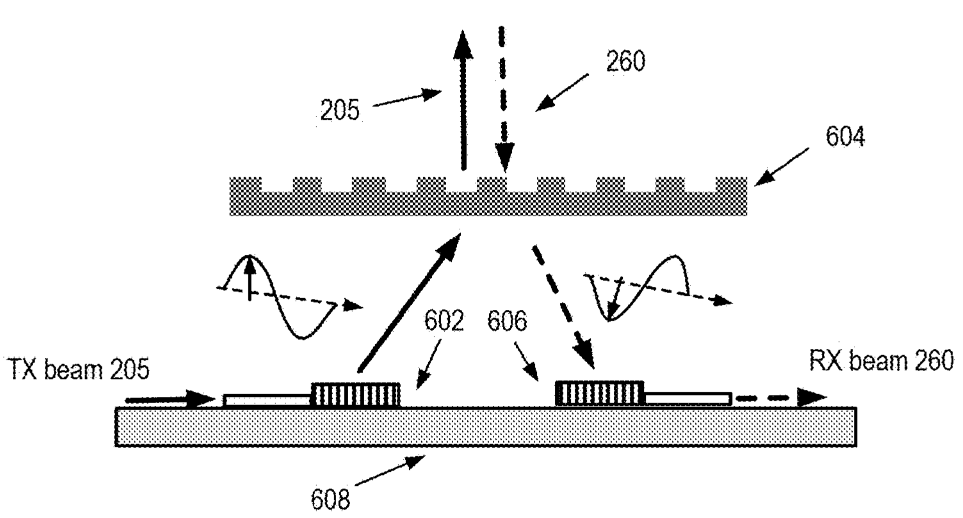

FIGS. 6A-6B illustrate example interface coupling devices that use polarization multiplexing in a quasi-monostatic configuration in an optical sensing system, in accordance with some implementations of the present disclosure. As illustrated, FIGS. 6A-6B depict the use of diffraction optical elements (DOEs) for collapsing and splitting of optical paths of a TX beam and an RX beam, for more efficient operations of optical sensing systems, by combining advantages of monostatic and bistatic transceiver configurations. More specifically, one advantage of the monostatic configuration lies in the intrinsic alignment of the optical paths of the TX beam and the RX beam. Yet RX beam processing in the monostatic configuration is usually complicated by retro-reflections of TX beams that can mask the RX beam. In the bistatic configuration, the TX beam and the RX beam are handled by different interface couplers and the retro-reflections do not obscure the RX beam. On the other hand, bistatic configurations need more elaborate alignment and tuning of the optical paths of the two beams. In the implementations illustrated in FIGS. 6A-6B, the TX antenna and the RX antenna are built using different interface couplers (so that the retro-reflections do not obscure the RX beam) but the optical paths of the two beams are merged before leaving the optical sensing system.

In FIGS. 6A-6B, the optical path of the TX beam is denoted with solid arrows and the optical path of the RX beam is denoted with dashed arrows. More specifically, as shown in FIG. 6A, an interface coupling device 600 can receive TX beam 205 that propagates along the plane of a PIC (e.g., integrated on a substrate 608) and is scattered away from that plane by a TX interface coupler 602. The scattered beam can be polarized, e.g., s-polarized, p-polarized, right-handed circularly (or elliptically) polarized, left-handed circularly (or elliptically) polarized, etc. For specificity, TX beam 205 is referred to as s-polarized herein but the same techniques can be used for p-polarized TX beam 205. In some implementations, TX beam 205 can be polarized by the beam preparation stage 210 of FIG. 2A and FIG. 2B, which can include one or more polarizers.

TX beam 205 can next be scattered by a polarization-sensitive DOE 604, e.g., diffraction grating that is configured to scatters-polarized light differently from p-polarized light. For simplicity, FIG. 6A illustrates DOE 604 that scatters s-polarized light but does not scatter p-polarized light. TX beam 205 can then be directed to an outside space. (Various other elements of interface coupling device 160, such as lenses, apertures, etc., are not shown in FIG. 6A for conciseness.) Interaction of TX beam 205 generates reflected light that is received by interface coupling device 600 as RX beam 260. Reflection of TX beam 205 by the object can scramble s-polarization so that RX beam 260 has both the s-polarized component and the p-polarized component. DOE 604 lets the p-polarized component pass to RX interface coupler 606. At the same time, DOE 604 can scatter the s-polarized component away from RX interface coupler 606 (e.g., back towards TX interface coupler 602, if time-reversal symmetry in DOE 604 is not broken, e.g., by the presence of gyrotropic magnetic media). As a result, the interface coupling system 600 realizes the bistatic configuration below DOE 604 but forces TX beam 205 and RX beam 260 to follow the same optical path above DOE 604, realizing the benefits of the monostatic configuration without the detriment of retro-reflections.

As pointed out above, in some implementations, s-polarization and p-polarization can be swapped. The diffraction pitch (spacing) of DOE 604 can be chosen to minimize crosstalk between TX beam 205 and RX beam 260. More specifically, the directions of TX beam 205 and RX beam 260 and the lateral distance between TX interface coupler 602 and RX interface coupler 606 can be chosen such that specular reflection of TX beam 205 from DOE 604 does not hit RX interface coupler 606.

In some implementations, DOE 604 may be a diffraction grating that scatters right-handed (or left-handed) circularly (or elliptically) polarized light, but does not scatter left-handed (or right-handed) circularly (or elliptically) polarized light. In particular, liquid crystal-based gratings that are sensitive to polarization handedness may be used as DOE 604.

Polarization-sensitive DOE 604 can be designed in multiple ways. In some implementations, a series of grooves can be made in an insulating slab (e.g., Titanium dioxide) resting on another insulator (e.g., glass) with the depth, width, and spacing between the grooves computed to ensure polarization-dependent transmission, e.g., undeflected transmission for s-polarized incident light (electric field parallel to the grooves) and deflected (scattered) transmission for p-polarized incident light. In some implementations, polarization-sensitive DOE 604 can be designed using volume holographic optical elements. In some implementations, high-efficiency polarization-sensitive diffraction gratings can be manufactured using polymerizable liquid crystals, e.g., using a stack of multiple chiral gratings, with opposite twist. In some implementations, DOE 604 may be made using birefringent materials, such as YVO4 crystals, LiNbO3 crystals, and the like. In some implementations, DOE 604 may be made using a combination of birefringent materials and non-birefringent materials.

Figure 6C:
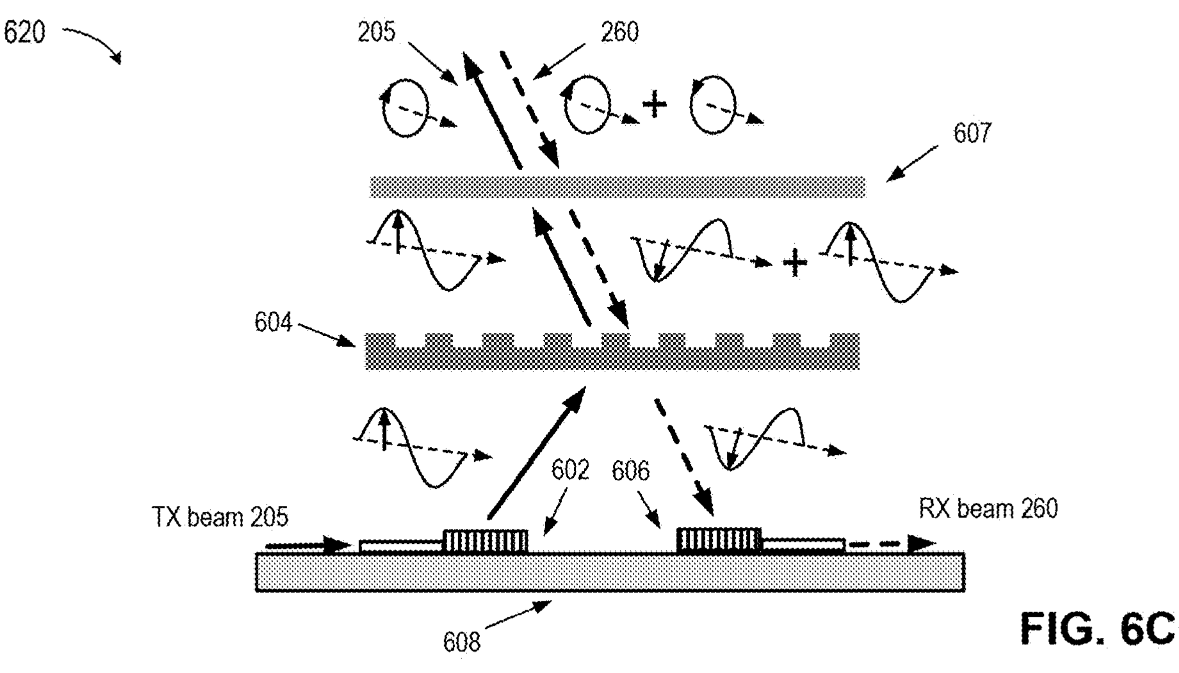

FIG. 6B illustrates another interface coupling device 610 in which polarization-sensitive DOE 604 scatters both s-polarization and p-polarization by different angles. In some implementations, DOE 604 may scatter right-handed (or left-handed) circularly (or elliptically) polarized light by a different angle than the left-handed (or right-handed) circularly (or elliptically) polarized light. FIG. 6C illustrates yet another interface coupling device 620 which uses an additional polarizing optical element for increased intensity of the polarized RX beam. More specifically, reflecting surfaces of target devices in typical lidar applications can generate fairly weak polarization changes, e.g., reflecting relatively little of s-polarized light into p-polarized light, or vice versa. On the other hand, the phase of each of the s-polarized light and p-polarized light is typically scrambled quite substantially upon reflection. Correspondingly, polarization of a circularly polarized light (being a special case of $\pm\pi/2$-shifted linear polarizations) is typically preserved to a much lesser degree. Interface coupling device 620 can take advantage of this scrambling by, e.g., using a quarter-wave plate 607 that transforms linearly-polarized TX beam 205 into a circularly-polarized (e.g., right-handed or left-handed) beam. RX beam 260 reflected from the target then represents a combination of two circularly polarized beams (with opposite handedness) of comparable magnitude. Upon passing through quarter-wave plate 607, RX beam 260 becomes a combination of two linearly-polarized components in which the p-polarized light is, generally, of the same power (by the order of magnitude) as the s-polarized light. The p-polarized light is then directed towards RX interface coupler 606, similarly to FIG. 6A.

Quarter-wave plates can be made of any birefringent material (e.g., lithium niobate, calcite, quartz, titanium dioxide, corundum, etc.) in which waves polarized along different axes (e.g., fast axis and slow axis) propagate with different speeds. The thickness of the quarter-wave plate can be selected in such a way that the relative phase shift between the two waves is $\pm\pi/2$ (or close to $\pm\pi/2$), to ensure a circularly polarized output. In some implementations, quarter-wave plate 607 can be positioned below DOE 604 rather than above DOE 604 (as in FIG. 6C).

Figure 6D:
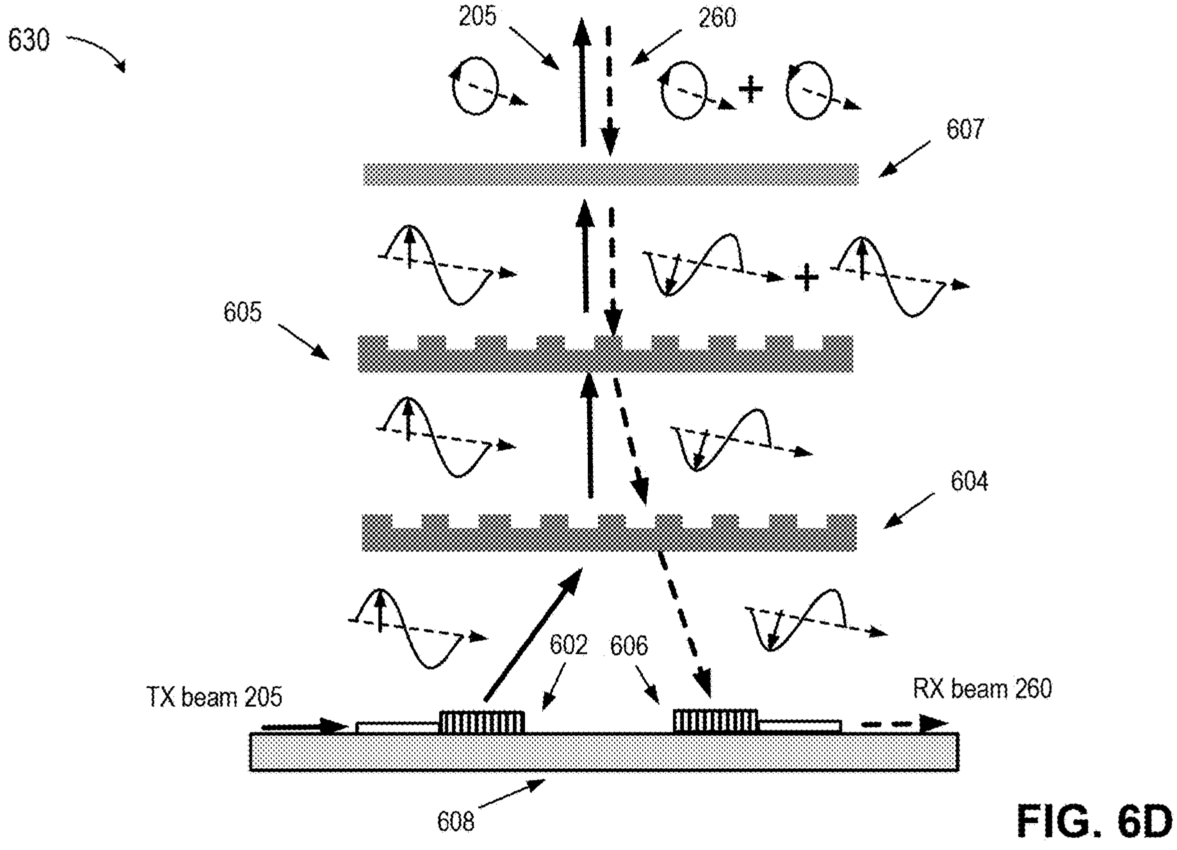

FIG. 6D illustrates an interface coupling device 630 which uses multiple diffractive optical elements sensitive to different polarizations. More specifically, s-polarized TX beam 205 is scattered away from the plane of the substrate 608 by TX interface coupler 602. The scattered TX beam 205 interacts with first DOE 604 that is sensitive to s-polarization, and changes the direction of its optical path. The TX beam then passes through a second DOE 605 that is sensitive to a different polarization (e.g., p-polarization) and, therefore, does not further deflect TX beam 205. TX beam 205 can optionally pass through quarter-wave plate 607 to become a circularly polarized beam before traveling to a target. RX beam 260 caused by interaction of TX beam 205 with the target then returns to the second DOE 605 (passing along the way through the quarter-wave plate 607, if deployed) which deflects the p-polarized portion of RX beam 260 away from the optical path of TX beam 205. The first DOE 604 does not further change the direction of the p-polarized part of RX beam 260, which is then received by RX interface coupler 606. Interface coupling device 630 has an added advantage of reducing cross-talk between TX beam 205 and RX beam 260 since practically available polarization-sensitive DOEs can be non-ideal with some degree of leakage into the opposite polarization channels.

Figure 7:
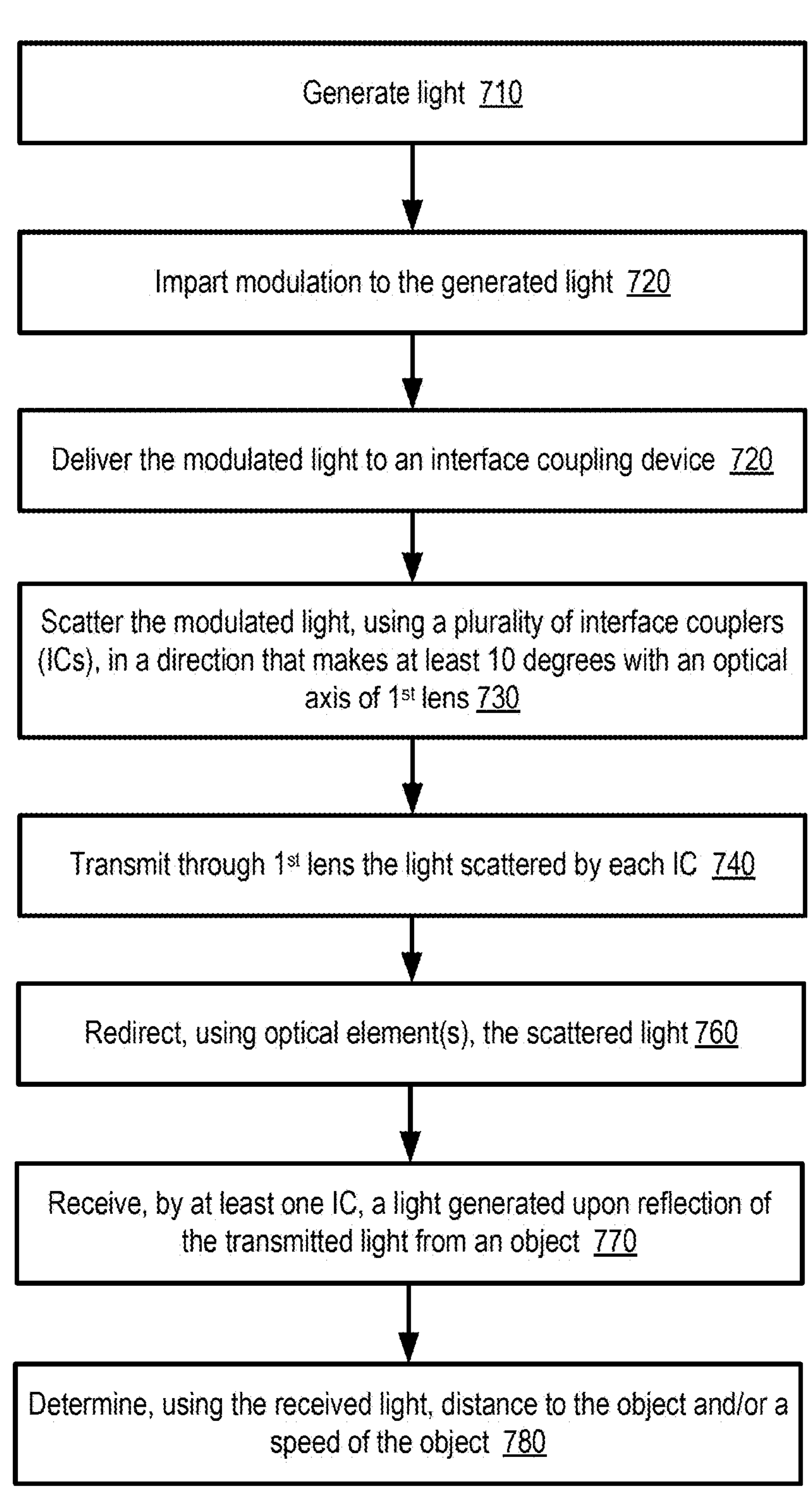
FIG. 7 depicts a flow diagram of an example method of operating an optical sensing system (e.g., a lidar) capable of supporting efficient pixel multiplexing, in accordance with some implementations of the present disclosure.
Figure 8:
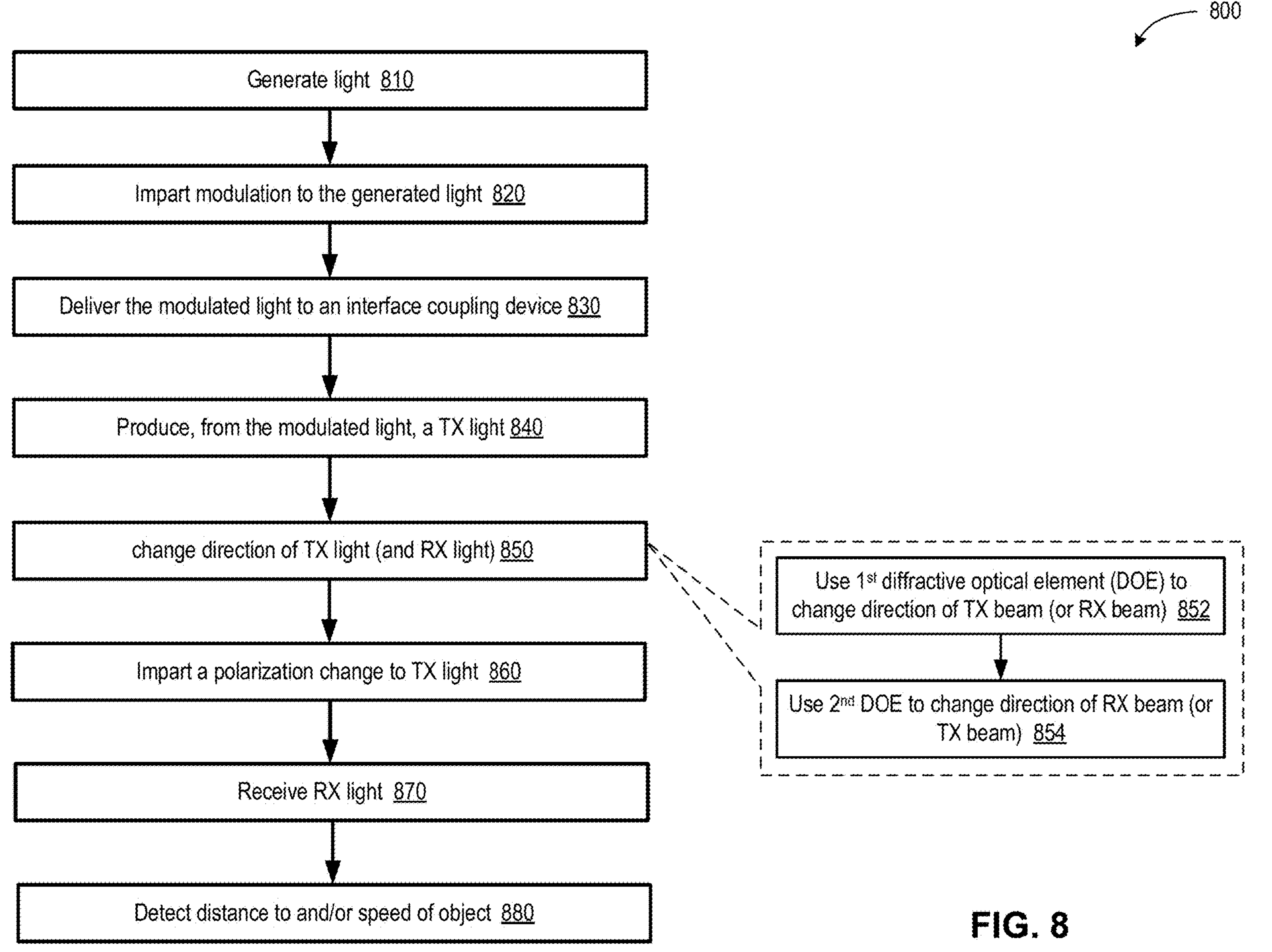
FIG. 8 depicts a flow diagram of an example method of operating an optical sensing system (e.g., a lidar) capable of supporting polarized beam steering to implement a quasi-monostatic optical transceiver, in accordance with some implementations of the present disclosure.

FIG. 7 and FIG. 8 depict flow diagrams of example methods 700 and 800 of efficient pixel multiplexing and polarized beam steering, which use the techniques described above. Methods 700 and 800 can be performed using systems and components described in relation to FIGS. 1-6, e.g., optical sensing system FIG. 2A or FIG. 2B. Methods 700 and 800 can be performed as part of obtaining range and velocity data that characterizes any suitable environment, e.g., an outside environment of a moving vehicle, including but not limited to an autonomous vehicle. Various operations of methods 700 and 800 can be performed in a different order compared with the order shown in FIG. 7 and FIG. 8. Some operations of methods 700 and 800 can be performed concurrently with other operations. Some operations of methods 700 and 800 can be optional. Methods 700 and 800 can be used to improve the range, efficiency, and reliability of velocity and distance detections by lidar devices. Any of the optical elements and components used to perform methods 700 and 800, e.g., waveguides, optical switches, modulators, phase shifters, control electrodes, heating electrodes, and the like, can be integrated on a photonic integrated circuit.

FIG. 7 depicts a flow diagram of an example method 700 of operating an optical sensing system (e.g., a lidar) capable of supporting efficient pixel multiplexing, in accordance with some implementations of the present disclosure. Method 700 can include, at block 710, generating a light using a light source (e.g., light source 202 in FIG. 2A and FIG. 2B). The light source can be a laser. In some implementations, the laser can be a semiconductor laser, a quantum dot laser, or any suitable laser integrated in a PIC (e.g., PIC 201 in FIG. 2A and FIG. 2B). In some implementations, the light source can be a laser located outside the PIC. The generated light can then be processed by one or more optical devices integrated on the PIC. More specifically, at block 720, method 700 can include imparting a modulation (e.g., phase modulation, frequency modulation, amplitude modulation, or any combination thereof) to the generated light (e.g., by optical modulator 220 in FIG. 2A and FIG. 2B).

At block 730, the modulated light can be delivered to an interface coupling device. The interface coupling device can include elements and components that are integrated on the PIC, e.g., a plurality of interface couplers (e.g., interface couplers 250 in FIG. 2A and FIG. 2B), and various components that are located outside the PIC, e.g., lenses, polarizers, diffraction gratings, and the like. At block 740, method 700 can include scattering the modulated light using at least some of the plurality of interface couplers (e.g., at least some of interface couplers 302 in FIGS. 3A-3D, interface couplers 402 in FIGS. 4A-4B, interface couplers 502 in FIG. 5, and the like). Scattering of the modulated light can be performed in a direction that makes an angle of at least 5 degrees with some reference direction, e.g., the direction of an optical axis of a first lens (e.g., lens 306 in FIGS. 3A-3D, lens 406 in FIGS. 4A-4B, lens 506 in FIG. 5, and the like). The direction of an optical axis can also be the normal direction to the plane of the PIC. In some implementations, the plurality of interface couplers can include at least a sub-plurality of interface couplers positioned around a curve (e.g., a circle, ellipse, and oval) within the plane of the PIC, e.g., as illustrated in FIGS. 3A-3D. In some implementations, each interface coupler of the plurality of interface couplers can include a diffraction grating.

At block 760, method 700 can continue with one or more optical elements of the interface coupling device redirecting the light scattered by the plurality of interface couplers. In some implementations, the scattered light can be redirected towards the first lens. In some implementations, the one or more optical elements can be located at the focal plane of the first lens. In some implementations, the one or more optical elements can include a second lens configured to focus the light scattered by the plurality of interface couplers (e.g., lens 403 in FIG. 4A or lens 405 in FIG. 4B). In some implementations, the second lens can be configured to focus the light scattered by the plurality of interface couplers at a point on the optical axis of the first lens (e.g., as illustrated in FIG. 4A and FIG. 4B). In some implementations, the one or more optical elements can include a plurality of lenses (e.g., microlenses 503-1 in FIG. 5). Each lens of the plurality of lenses can be configured to redirect the light scattered by a respective interface coupler. In some implementations, the one or more optical elements can include a plurality of prisms (e.g., microprisms 503-2 in FIG. 5). Each prism can be configured to redirect the light scattered by a respective interface coupler. In some implementations, the one or more optical elements can include one or more diffraction gratings (e.g., diffraction gratings 503-3 in FIG. 5). Each diffraction grating can be configured to redirect the light scattered by at least one of the plurality of interface couplers.

At block 760, method 700 can continue with the first lens transmitting the light scattered by each interface coupler along a respective direction of a plurality of directions (e.g., as illustrated with the picture of chief rays in FIGS. 3A-3D, FIGS. 4A-4B, and FIG. 5).

At block 770, method 700 can include receiving a light generated upon reflection of the transmitted light from an object. In some instances, only one of the plurality of interface couplers can receive the reflected light (e.g., when light transmitted by other interface couplers does not strike an object within the range of sensitivity of the lidar sensing system). In some instances, multiple interface couplers can receive the reflected light. At block 780, method 700 can include determining, using the received light, at least one of a distance to the object or a speed of the object (e.g., as described in conjunction with FIG. 2A). In some instances, the determined values can include distance to and/or speeds of multiple objects, FIG. 8 depicts a flow diagram of an example method 800 of operating an optical sensing system (e.g., a lidar) capable of supporting polarized beam steering to implement a quasi-monostatic optical transceiver, in accordance with some implementations of the present disclosure. Method 800 can include, at block 810, generating a light using a light source (e.g., light source 202 in FIG. 2A and FIG. 2B). The light source can be a laser. In some implementations, the laser can be a semiconductor laser, a quantum dot laser, or any suitable laser integrated in a PIC (e.g., PIC 201 in FIG. 2A and FIG. 2B). In some implementations, the light source can be a laser located outside the PIC. The generated light can then be processed by one or more optical devices integrated on the PIC. More specifically, at block 820, method 800 can include imparting a modulation (e.g., phase modulation, frequency modulation, amplitude modulation, or any combination thereof) to the generated light (e.g., by optical modulator 220 in FIG. 2A and FIG. 2B).

At block 830, the modulated light can be delivered to an interface coupling device. The interface coupling device can include elements and components that are integrated on the PIC, e.g., a plurality of interface couplers (e.g., interface couplers 250 in FIG. 2A and FIG. 2B), and components that are located outside the PIC, e.g., lenses, polarizers, diffraction gratings, and the like. At block 840, method 800 can include producing, from the modulated light, a TX light using a first interface coupler (e.g., TX interface coupler 602 in FIGS. 6A-6D). The first interface coupler can be integrated on the PIC. The TX light can have a first polarization (e.g., s-polarization or p-polarization).

At block 850, method 800 can continue with using one or more polarization-sensitive diffraction optical elements (DOEs) to change direction of at least one of the TX light or an RX light. The RX light can be generated upon interaction of the TX light with an object. The RX light can have a second polarization (e.g., p-polarization or s-polarization). In some implementations, as illustrated with the callout portion of FIG. 8, changing direction of the TX beam can be performed using the following operations, which can also change the direction of the RX beam. More specifically, at block 852, method 800 can include using a first polarization-sensitive DOE to change direction of the TX light (e.g., using DOE 604 as shown in FIG. 6D). Alternatively, the first DOE can change the direction of the RX light. At block 854, method 800 can include using a second polarization-sensitive DOE to change direction of at least the RX light (e.g., using DOE 605 as shown in FIG. 6D). Alternatively, the second DOE can change the direction of the TX light.

At block 860, method 800 can include imparting a polarization change to the TX light using a polarizing element. For example, the polarizing element can be a quarter-wave plate (e.g., quarter-wave plate 607 in FIGS. 6C-6D), which can cause the polarization change of the TX light from a linear polarization (e.g., s-polarization or p-polarization) to a circular polarization (e.g., right-handed polarization or left-handed polarization). In some implementations, the polarization change of the TX light can be from a linear polarization to an elliptic polarization.

At block 870, method 800 can continue with using a second interface coupler (e.g., RX interface coupler 606 in FIGS. 6A-6D) to receive the RX light (e.g., RX beam 260 in FIGS. 6A-6D). At block 880, method 800 can include determining, using the received RX light, at least one of a distance to the object or a speed of the object (e.g., as described in conjunction with FIG. 2A). In some implementations, the PIC-based lidar can include multiple pairs of TX interface couplers/RX interface couplers, each pair used as the transceiver to determine distances to and/or speeds of separate objects.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. An optical system comprising:

a light source configured to generate a light;

one or more optical devices, integrated in a photonic integrated circuit (PIC), configured to:

impart modulation to the generated light, and deliver the modulated light to an interface coupling device; and the interface coupling device, comprising:

a plurality of interface couplers (ICs) integrated on the PIC, wherein each IC is configured to scatter the modulated light in a direction that makes at least an angle of 5 degrees with an optical axis of a first lens; and the first lens configured to transmit the light scattered by each IC along a respective direction of a plurality of directions.

2. The optical system of claim 1, wherein the plurality of ICs comprises at least a sub-plurality of ICs positioned around a curve within a plane of the PIC.

3. The optical system of claim 1, wherein the interface coupling device further comprises one or more optical elements configured to redirect the light scattered by the plurality of ICs.

4. The optical system of claim 3, wherein the one or more optical elements are located at a focal plane of the first lens.

5. The optical system of claim 3, wherein the one or more optical elements comprise a second lens configured to focus the light scattered by the plurality of ICs.

6. The optical system of claim 5, wherein the second lens is configured to focus the light scattered by the plurality of ICs at a point on the optical axis of the first lens.

7. The optical system of claim 3, wherein the one or more optical elements comprise a plurality of lenses, each lens of the plurality of lenses configured to redirect the light scattered by a respective IC of the plurality of ICs.

8. The optical system of claim 3, wherein the one or more optical elements comprise a plurality of prisms, each prism of the plurality of prism configured to redirect the light scattered by a respective IC of the plurality of ICs.

9. The optical system of claim 3, wherein the one or more optical elements comprise one or more diffraction gratings, wherein each diffraction grating is configured to redirect the light scattered by at least one of the plurality of ICs.

10. The optical system of claim 1, wherein each IC of the plurality of ICs comprises a diffraction grating.

11. The optical system of claim 1, wherein at least one IC of the plurality of ICs is configured to receive a light generated upon reflection of the transmitted light from an object, and wherein the optical system is further configured to determine, using the received light, at least one of a distance to the object or a speed of the object.

12. An optical system comprising:

a light source configured to generate a light;

one or more optical devices, integrated in a photonic integrated circuit (PIC), configured to:

impart modulation to the generated light, and deliver the modulated light to an interface coupling device; and the interface coupling device, comprising:

a first interface coupler (IC), integrated in the PIC, configured to produce, from the modulated light, a transmitted (TX) light, wherein the TX light has a first polarization;

a second IC, integrated in the PIC, configured to receive a received (RX) light generated upon interaction of the TX light with an object, wherein the RX light has a second polarization; and one or more polarization-sensitive diffraction optical elements (DOEs) configured to change direction of at least one of the TX light or the RX light.

13. The optical system of claim 12, wherein the one or more polarization-sensitive DOEs comprise a first DOE configured to change direction of at least one of the TX light or the RX light.

14. The optical system of claim 13, wherein the one or more polarization-sensitive DOEs comprise a second DOE configured to change direction of at least the other one of the TX light or the RX light.

15. The optical system of claim 12, wherein the interface coupling device further comprises:

a polarizing element configured to impart a polarization change to the TX light.

16. The optical system of claim 15, wherein the polarization change of the TX light is from a linear polarization to a circular polarization.

17. A method comprising:

generating a light using a light source;

imparting modulation to the generated light;

delivering the modulated light to an interface coupling device comprising a plurality of interface couplers (ICs) integrated on a photonic integrated circuit (PIC);

scattering the modulated light, using the plurality of ICs, wherein each IC is configured to scatter the modulated light in a direction that makes at least an angle of 5 degrees with an optical axis of a first lens; and transmitting through the first lens the light scattered by each IC along a respective direction of a plurality of directions.

18. The method of claim 17, further comprising:

redirecting, using one or more optical elements, the light scattered by the plurality of ICs.

19. The method of claim 18, wherein the one or more optical elements comprise at least one of:

a second lens, a plurality of prisms, or one or more diffraction gratings.

20. The method of claim 17, further comprising:

receiving, by at least one IC of the plurality of ICs, a light generated upon reflection of the transmitted light from an object; and determining, using the received light, at least one of a distance to the object or a speed of the object.

* * * * *